(12) United States Patent
Hunnicutt

(10) Patent No.: US 8,113,482 B2
(45) Date of Patent: Feb. 14, 2012

(54) MICROVALVE DEVICE WITH IMPROVED FLUID ROUTING

(75) Inventor: Harry A. Hunnicutt, Austin, TX (US)

(73) Assignee: DunAn Microstaq, Austin, TX (US)

( * ) Notice: Subject to any disclaimer, the term of this patent is extended or adjusted under 35 U.S.C. 154(b) by 853 days.

(21) Appl. No.: 12/190,436

(22) Filed: Aug. 12, 2008

(65) Prior Publication Data

US 2010/0038576 A1 Feb. 18, 2010

(51) Int. Cl.
*F16K 31/12* (2006.01)
(52) U.S. Cl. ............. 251/31; 251/12; 251/26; 251/281; 251/318; 137/625.25; 137/625.65
(58) Field of Classification Search .................... 251/12, 251/26, 31, 281, 318; 137/596.14, 625.25, 137/625.28, 625.33, 625.65
See application file for complete search history.

(56) References Cited

U.S. PATENT DOCUMENTS

| | | |
|---|---|---|
| 886,045 A | 4/1908 | Ehrlich et al. |
| 1,886,205 A | 11/1932 | Lyford |
| 1,926,031 A | 9/1933 | Boynton |
| 2,412,205 A | 12/1946 | Cook |
| 2,504,055 A | 4/1950 | Thomas |
| 2,840,107 A | 6/1958 | Campbell |
| 2,875,779 A | 3/1959 | Campbell |
| 3,031,747 A | 5/1962 | Green |
| 3,729,807 A | 5/1973 | Fujiwara |
| 3,747,628 A | 7/1973 | Holster et al. |
| 3,860,949 A | 1/1975 | Stoeckert et al. |
| 4,005,454 A | 1/1977 | Froloff et al. |
| 4,019,388 A | 4/1977 | Hall, II et al. |
| 4,023,725 A | 5/1977 | Ivett et al. |
| 4,100,236 A | 7/1978 | Gordon et al. |
| 4,152,540 A | 5/1979 | Duncan et al. |
| 4,181,249 A | 1/1980 | Peterson et al. |
| 4,298,023 A | 11/1981 | McGinnis |
| 4,341,816 A | 7/1982 | Lauterbach et al. |
| 4,434,813 A | 3/1984 | Mon |
| 4,476,893 A | 10/1984 | Schwelm |
| 4,543,875 A | 10/1985 | Imhof |
| 4,581,624 A | 4/1986 | O'Connor |
| 4,593,719 A | 6/1986 | Leonard et al. |
| 4,628,576 A | 12/1986 | Giachino et al. |
| 4,647,013 A | 3/1987 | Giachino et al. |
| 4,661,835 A | 4/1987 | Gademann et al. |
| 4,687,419 A | 8/1987 | Suzuki et al. |
| 4,772,935 A | 9/1988 | Lawler et al. |

(Continued)

FOREIGN PATENT DOCUMENTS

DE 2215526 10/1973

(Continued)

OTHER PUBLICATIONS

Gui, C. et al, "Selective Wafer Bonding by Surface Roughness Control", Journal of The Electrochemical Society, 148 (4) G225-G228 (2001).

(Continued)

*Primary Examiner* — Steven J Ganey
(74) *Attorney, Agent, or Firm* — MacMillan, Sobanski & Todd, LLC

(57) ABSTRACT

A microvalve device for controlling the supply of pressurized fluid to a load in a fluid circuit, and having multiple internal fluid conduits for providing pressure feedback.

21 Claims, 11 Drawing Sheets

U.S. PATENT DOCUMENTS

| | | |
|---|---|---|
| 4,821,997 A | 4/1989 | Zdeblick |
| 4,824,073 A | 4/1989 | Zdeblick |
| 4,826,131 A | 5/1989 | Mikkor |
| 4,828,184 A | 5/1989 | Gardner et al. |
| 4,869,282 A | 9/1989 | Sittler et al. |
| 4,938,742 A | 7/1990 | Smits |
| 4,943,032 A | 7/1990 | Zdeblick |
| 4,946,350 A | 8/1990 | Suzuki et al. |
| 4,959,581 A | 9/1990 | Dantlgraber |
| 4,966,646 A | 10/1990 | Zdeblick |
| 5,029,805 A | 7/1991 | Albarda et al. |
| 5,037,778 A | 8/1991 | Stark et al. |
| 5,050,838 A | 9/1991 | Beatty et al. |
| 5,054,522 A | 10/1991 | Kowanz et al. |
| 5,058,856 A | 10/1991 | Gordon et al. |
| 5,061,914 A | 10/1991 | Busch et al. |
| 5,064,165 A | 11/1991 | Jerman |
| 5,065,978 A | 11/1991 | Albarda et al. |
| 5,066,533 A | 11/1991 | America et al. |
| 5,069,419 A | 12/1991 | Jerman |
| 5,074,629 A | 12/1991 | Zdeblick |
| 5,082,242 A | 1/1992 | Bonne et al. |
| 5,096,643 A | 3/1992 | Kowanz et al. |
| 5,116,457 A | 5/1992 | Jerman |
| 5,131,729 A | 7/1992 | Wetzel |
| 5,133,379 A | 7/1992 | Jacobsen et al. |
| 5,142,781 A | 9/1992 | Mettner et al. |
| 5,161,774 A | 11/1992 | Engelsdorf et al. |
| 5,169,472 A | 12/1992 | Goebel |
| 5,176,358 A | 1/1993 | Bonne et al. |
| 5,177,579 A | 1/1993 | Jerman |
| 5,178,190 A | 1/1993 | Mettner |
| 5,179,499 A | 1/1993 | MacDonald et al. |
| 5,180,623 A | 1/1993 | Ohnstein |
| 5,197,517 A | 3/1993 | Perera |
| 5,209,118 A | 5/1993 | Jerman |
| 5,215,244 A | 6/1993 | Buchholz et al. |
| 5,216,273 A | 6/1993 | Doering et al. |
| 5,217,283 A | 6/1993 | Watanabe |
| 5,222,521 A | 6/1993 | Kihlberg |
| 5,238,223 A | 8/1993 | Mettner et al. |
| 5,244,537 A | 9/1993 | Ohnstein |
| 5,267,589 A | 12/1993 | Watanabe |
| 5,271,431 A | 12/1993 | Mettner et al. |
| 5,271,597 A | 12/1993 | Jerman |
| 5,309,943 A | 5/1994 | Stevenson et al. |
| 5,323,999 A | 6/1994 | Bonne et al. |
| 5,325,880 A | 7/1994 | Johnson et al. |
| 5,333,831 A | 8/1994 | Barth et al. |
| 5,336,062 A | 8/1994 | Richter |
| 5,355,712 A | 10/1994 | Petersen et al. |
| 5,368,704 A | 11/1994 | Madou et al. |
| 5,375,919 A | 12/1994 | Furuhashi |
| 5,400,824 A | 3/1995 | Gschwendtner et al. |
| 5,417,235 A | 5/1995 | Wise et al. |
| 5,445,185 A | 8/1995 | Watanabe et al. |
| 5,458,405 A | 10/1995 | Watanabe |
| 5,543,349 A | 8/1996 | Kurtz et al. |
| 5,553,790 A | 9/1996 | Findler et al. |
| 5,566,703 A | 10/1996 | Watanabe et al. |
| 5,577,533 A | 11/1996 | Cook, Jr. |
| 5,611,214 A | 3/1997 | Wegeng et al. |
| 5,785,295 A | 7/1998 | Tsai |
| 5,810,325 A | 9/1998 | Carr |
| 5,838,351 A | 11/1998 | Weber |
| 5,848,605 A | 12/1998 | Bailey et al. |
| 5,856,705 A | 1/1999 | Ting |
| 5,873,385 A | 2/1999 | Bloom et al. |
| 5,909,078 A | 6/1999 | Wood et al. |
| 5,926,955 A | 7/1999 | Kober |
| 5,941,608 A | 8/1999 | Campau et al. |
| 5,954,079 A | 9/1999 | Barth et al. |
| 5,955,817 A | 9/1999 | Dhuler et al. |
| 5,970,998 A | 10/1999 | Talbot et al. |
| 5,994,816 A | 11/1999 | Dhuler et al. |
| 6,019,437 A | 2/2000 | Barron et al. |
| 6,023,121 A | 2/2000 | Dhuler et al. |
| 6,038,928 A | 3/2000 | Maluf et al. |
| 6,041,650 A | 3/2000 | Swindler et al. |
| 6,096,149 A | 8/2000 | Hetrick et al. |
| 6,105,737 A | 8/2000 | Weigert et al. |
| 6,114,794 A | 9/2000 | Dhuler et al. |
| 6,116,863 A | 9/2000 | Ahn et al. |
| 6,123,316 A | 9/2000 | Biegelsen et al. |
| 6,124,663 A | 9/2000 | Haake et al. |
| 6,171,972 B1 | 1/2001 | Mehregany et al. |
| 6,182,742 B1 | 2/2001 | Tatsuya et al. |
| 6,224,445 B1 | 5/2001 | Neukermans et al. |
| 6,255,757 B1 | 7/2001 | Dhuler et al. |
| 6,279,606 B1 | 8/2001 | Hunnicutt et al. |
| 6,283,441 B1 | 9/2001 | Tian |
| 6,386,507 B2 | 5/2002 | Dhuler et al. |
| 6,390,782 B1 | 5/2002 | Booth et al. |
| 6,494,804 B1 | 12/2002 | Hunnicutt et al. |
| 6,505,811 B1 | 1/2003 | Barron et al. |
| 6,520,197 B2 | 2/2003 | Deshmukh et al. |
| 6,523,560 B1 | 2/2003 | Williams et al. |
| 6,533,366 B1 | 3/2003 | Barron et al. |
| 6,540,203 B1 * | 4/2003 | Hunnicutt ............ 251/26 |
| 6,581,640 B1 | 6/2003 | Barron |
| 6,637,722 B2 * | 10/2003 | Hunnicutt ............ 251/26 |
| 6,662,581 B2 | 12/2003 | Hirota et al. |
| 6,694,998 B1 | 2/2004 | Hunnicutt |
| 6,724,718 B1 | 4/2004 | Shinohara et al. |
| 6,761,420 B2 | 7/2004 | Maluf et al. |
| 6,845,962 B1 | 1/2005 | Barron et al. |
| 6,872,902 B2 | 3/2005 | Cohn et al. |
| 6,958,255 B2 | 10/2005 | Khuri-Yakub et al. |
| 6,966,329 B2 | 11/2005 | Liberfarb |
| 7,011,378 B2 | 3/2006 | Maluf et al. |
| 7,063,100 B2 | 6/2006 | Liberfarb |
| 7,372,074 B2 | 5/2008 | Milne et al. |
| 2002/0014106 A1 | 2/2002 | Srinivasan et al. |
| 2002/0029814 A1 | 3/2002 | Unger et al. |
| 2002/0096421 A1 | 7/2002 | Cohn et al. |
| 2002/0174891 A1 | 11/2002 | Maluf et al. |
| 2003/0061889 A1 | 4/2003 | Tadigadapa et al. |
| 2003/0092526 A1 | 5/2003 | Hunnicutt et al. |
| 2003/0098612 A1 | 5/2003 | Maluf et al. |
| 2003/0159811 A1 | 8/2003 | Nurmi |
| 2003/0206832 A1 | 11/2003 | Thiebaud et al. |
| 2005/0121090 A1 | 6/2005 | Hunnicutt |
| 2005/0200001 A1 | 9/2005 | Joshi et al. |
| 2005/0205136 A1 | 9/2005 | Freeman |
| 2006/0218953 A1 | 10/2006 | Hirota |
| 2006/0243331 A1 | 11/2006 | Fuller et al. |
| 2010/0225708 A1 | 9/2010 | Peng et al. |

FOREIGN PATENT DOCUMENTS

| | | |
|---|---|---|
| DE | 2930779 | 2/1980 |
| DE | 340104 | 7/1985 |
| DE | 250948 | 1/1988 |
| DE | 4101575 | 7/1992 |
| DE | 4417251 | 11/1995 |
| DE | 4422942 | 1/1996 |
| EP | 261972 | 3/1988 |
| EP | 1024285 | 8/2000 |
| GB | 2238267 | 5/1991 |
| JP | SHO39-990 | 2/1964 |
| JP | 2006-080194 | 3/2006 |
| WO | WO99/16096 | 4/1999 |
| WO | WO99/24783 | 5/1999 |
| WO | WO00/14415 | 3/2000 |
| WO | 2005/084211 | 9/2005 |

OTHER PUBLICATIONS

Gui, C. et al., "Fusion bonding of rough surfaces with polishing technique for silicon micromachining", Microsystem Technologies (1997) 122-128.

Zhixiong Liu et al., "Micromechanism fabrication using silicon fusion bonding", Robotics and Computer Integrated Manufacturing 17 (2001) 131-137.

"A Silicon Microvalve for the Proportional Control of Fluids" by K.R. Williams, N.I. Maluf, E.N. Fuller, R.J. Barron, D.P. Jaeggi, and B.P. van Drieënhuizen, Transducers '99, Proc. 10th International Conference on Solid State Sensors and Actuators, held Jun. 7-10, 1999, Sendai, Japan, pp. 18-21.

"Process for in-plane and out-of-plane single-crystal-silicon thermal microactuators"; J. Mark Noworolski, et al.; Sensors and Actuators A 55 (1996); pp. 65-69.

Ayón et al., "Etching Characteristics and Profile Control in a Time Multiplexed ICP Etcher," Proc. of Solid State Sensor and Actuator Workshop Technical Digest, Hilton Head SC, (Jun. 1998) 41-44.

Bartha et al., "Low Temperature Etching of Si in High Density Plasma Using SF6/O2," Microelectronic Engineering, Elsevier Science B.V., vol. 27, (1995) 453-456.

Fung et al., "Deep Etching of Silicon Using Plasma" Proc. of the Workshop on Micromachining and Micropackaging of Transducers, (Nov. 7-8, 1984) pp. 159-164.

IEEE Technical Digest entitled "Compliant Electro-thermal Microactuators", J. Jonsmann, O. Sigmund, S. Bouwstra, Twelfth IEEE International Conference on Micro Electro Mechanical Systems held Jan. 17-21, 1999, Orlando, Florida, pp. 588-593, IEEE Catalog No. 99CH36291C.

Klaassen et al., "Silicon Fusion Bonding and Deep Reactive Ion Etching; A New Technology for Microstructures," Proc., Transducers 95 Stockholm Sweden, (1995) 556-559.

Linder et al., "Deep Dry Etching Techniques as a New IC Compatible Tool for Silicon Micromachining," Proc,. Transducers, vol. 91, (Jun. 1991) pp. 524-527.

Noworolski et al., "Process for in-plane and out-of-plane single-crystal-silicon thermal microactuators," Sensors and Actuators A, Elsevier Science S.A., vol. 55, No. 1, (1996) 65-69.

Petersen et al. "Surfaced Micromachined Structures Fabricated with Silicon Fusion Bonding" Proc., Transducers 91, (Jun. 1992) pp. 397-399.

Yunkin et al., "Highly Anisotropic Selective Reactive Ion Etching of Deep Trenches in Silicon," Microelectronic Engineering, Elsevier Science B.V., vol. 23, (1994) pp. 373-376.

International Search Report dated Apr. 5, 2010 for Application No. PCT/US2009/05355.

Günther, Götz, "Entwicklung eines pneumatischen ½-Wege-Mikroventils", O + P Olhydraulik Und Pneumatik, Vereinigte Fachverlage, Mainz, DE, vol. 42, No. 6, Jun. 1, 1998, pp. 396-398, XP000831050, ISSN: 0341-2660.

Booth, Steve and Kaina, Rachid, Fluid Handling—Big Gains from Tiny Valve, Appliance Design (Apr. 2008), pp. 46-48.

Controls Overview for Microstaq Silicon Expansion Valve (SEV), Rev. 1, Dec. 2008, http://www.microstaq.com/pdf/SEV_controls.pdf, accessed May 17, 2010.

Copeland, Michael V., Electronic valves promise big energy savings, FORTUNE (Sep. 9, 2008), http://techland.blogs.fortune.cnn.com/2008/09/09/electronic-valves-promise-big-energy-savings, accessed Sep. 9, 2008.

Higginbotham, Stacey, Microstaq's Tiny Valves Mean Big Energy Savings, http//earth2tech.com/2008/09/09/microstaqs-tiny-valves-mean-big-energy savings (posted Dec. 8, 2008), accessed Sep. 9, 2008.

Keefe, Bob, Texas firm says value-replacing chip can drastically cut energy use, Atlanta Metro News (Sep. 10, 2008), http://www.ajc.com/search/content/shared/money/stories/2008/09/microstaq10_cox-F9782.html, accessed Sep. 10, 2008.

Luckevich, Mark, MEMS microvlaves: the new valve world, Valve World (May 2007), pp. 79-83.

MEMS, Microfluidics and Microsystems Executive Review, http:www.memsinvestorjournal.com/2009/04/mems-applications-for-flow-control-.html, accessed May 17, 2010.

Microstaq Announces High Volume Production of MEMS-Based Silicon Expansion Valve, http://www.earthtimes.org/articles/printpressstory.php?news+1138955 (posted Jan. 27, 2010), accessed Jan. 27, 2010.

Microstaq Product Description, Proportional Direct Acting Silicon Control Valve (PDA-3), http://www.microstaq.com/products/pda3.html, accessed May 17, 2010.

Microstaq Product Description, Proportional Piloted Silicon Control Valve (CPS-4), http://www.microstaq.com/products/cps4.html, accessed. May 17, 2010.

Microstaq Product Descriptions, SEV, CPS-4, and PDA-3, http://www.microstaq.com/products/index.html, accessed May 17, 2010.

Microstaq Technology Page, http://www.microstaq.com/technology/index.html, accessed May 17, 2010.

Press Release, Freescale and Microstaq Join Forces on Smart Superheat Control System for HVAC and Refrigeration Efficiency, http://www.microstaq.com/pressReleases/prDetail_04.html (posted Jan. 22, 2008), accessed May 17, 2010.

Press Release, Microstaq Mastering Electronic.Controls for Fluid-Control Industry, http://www.microstaq.com/pressReleases/prDetail_02.html (posted May 5, 2005), accessed May 17, 2010.

Press Release, Microstaq Unveils Revolutionary Silicon Expansion Valve at Demo 2008, http://www.microstaq.com/pressReleases/prDetail_05.html (posted Sep. 8, 2008), accessed May 17, 2010.

Press Release, Nanotechnology Partnerships, Connections Spur Innovation for Fluid Control Industries, http://www.microstaq.com/pressReleases/prDetail_03.html (posted Jun. 9, 2005), accessed May 17, 2010.

Product Review, greentechZONE Products for the week of May 18, 2009, http://www.en-genius.net/site/zones/greentechZONE/product_reviews/grnp_051809, accessed May 17, 2010.

SEV Installation Instructions, http://www.microstaq.com/pdf/SEV_Instruction_sheet.pdf, accessed May 17, 2010.

Silicon Expansion Valve (SEV)—For Heating, Cooling, and Refrigeration Applications, http://www.microstaq.com/pdf/SEV_Quicksheet.pdf, accessed May 17, 2010.

Silicon Expansion Valve Data Sheet, http://www.microstaq.com/pdf/SEV_Datasheet_1_8.pdf, accessed May 17, 2010.

Silicon Expansion Valve Information Sheet, http://www.microstaq.com/pdf/SEV_Infosheet_2_0.pdf, accessed May 17, 2010.

SMIC Announces Successful Qualification of a MEMS Chip for Microstaq, http://www.prnewswire.com/news-releases/smic-announces-successful-qualification-of-a-mems-chip-for-microstaq-65968252.html (posted Oct. 26, 2009), accessed May 17, 2010.

SMIC quals Microstaq MEMS chip for fluid control, http://www.electroiq.com/ElectroiQ/en-us/index/display/Nanotech_Article_Tools_Template.articles.small-times.nanotechmems.mems.microfluidics.2009.10.smic-quals_microstaq.html, (posted Oct. 26, 2009), acc.

Tiny Silicon Chip Developed by Microstaq Will Revolutionize Car Technology, http://www.nsti.org/press/PRshow.html?id=160 (posted May 19, 2005), accessed May 19, 2005.

Turpin, Joanna R., Soft Economy, Energy Prices Spur Interest in Technologies, http://www.achrnews.com/copyright/BNP_GUID_9-5-2006_A_10000000000000483182, accessed May 18, 2010.

Uibel, Jeff, The Miniaturization of Flow Control (Article prepared for the 9th International Symposium on Fluid Control Measurement and Visualization (FLUCOME 2007)), Journal of Visualization (vol. 11, No. 1, 2008), IOS Press.

* cited by examiner

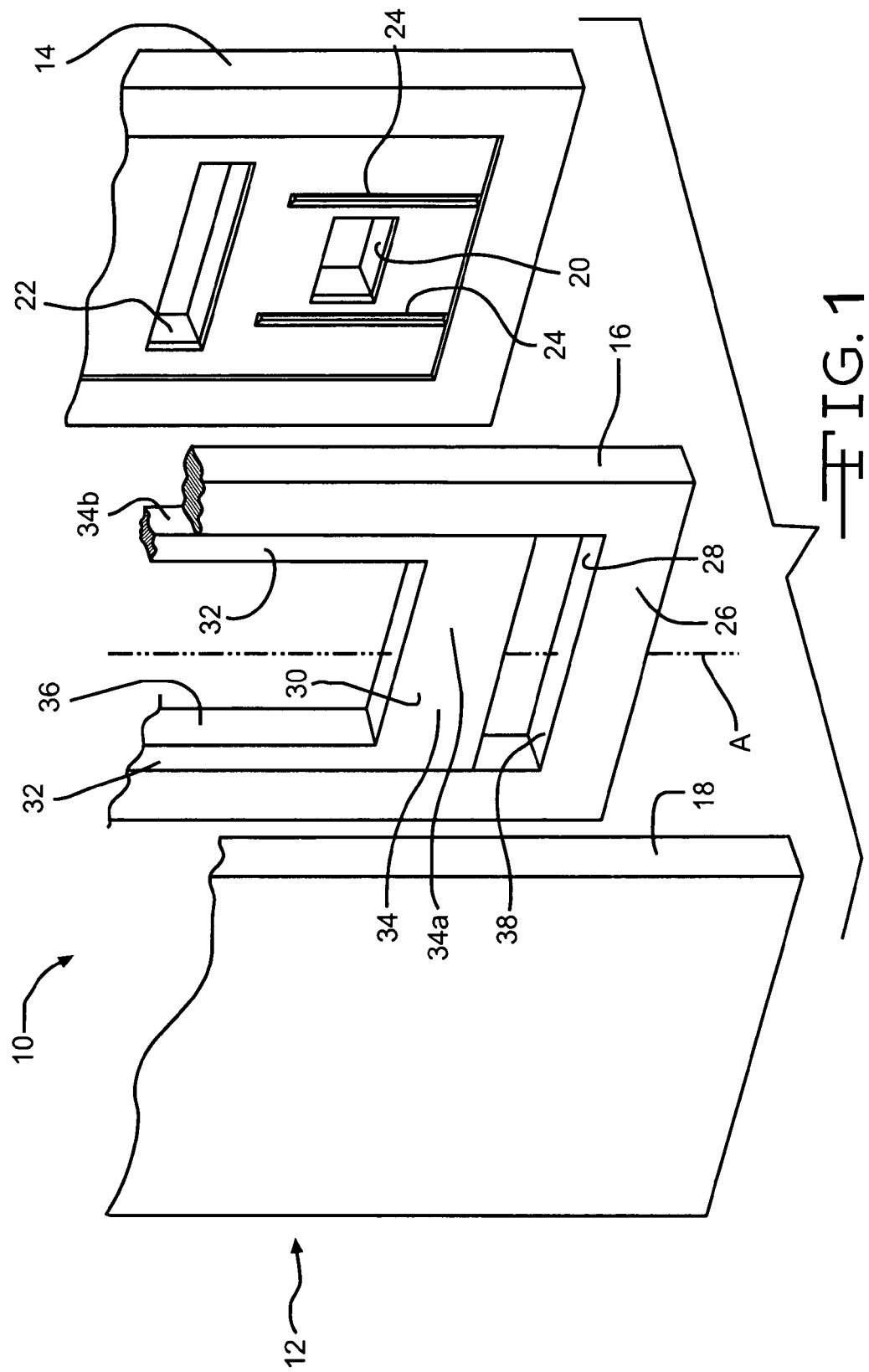

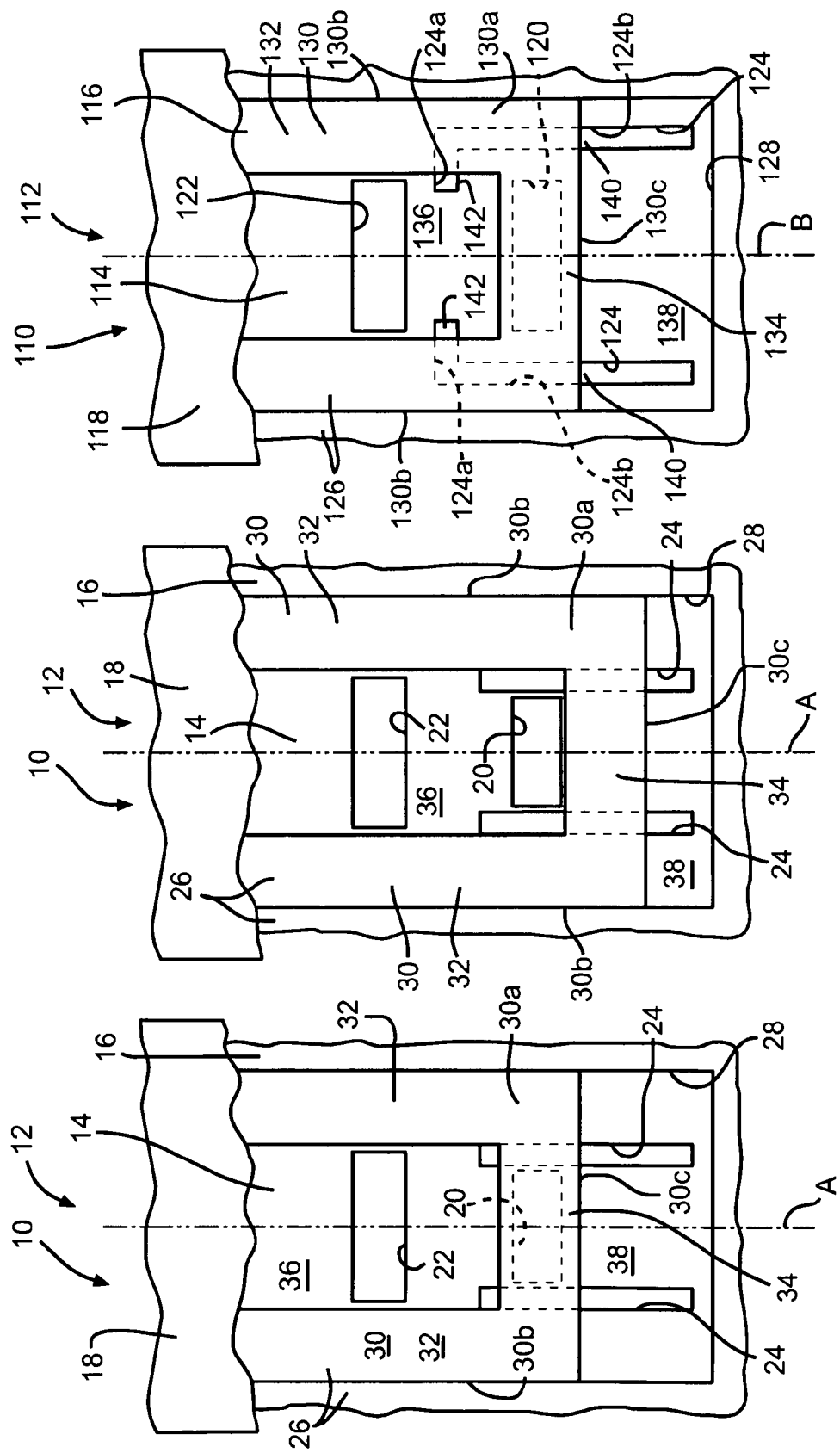

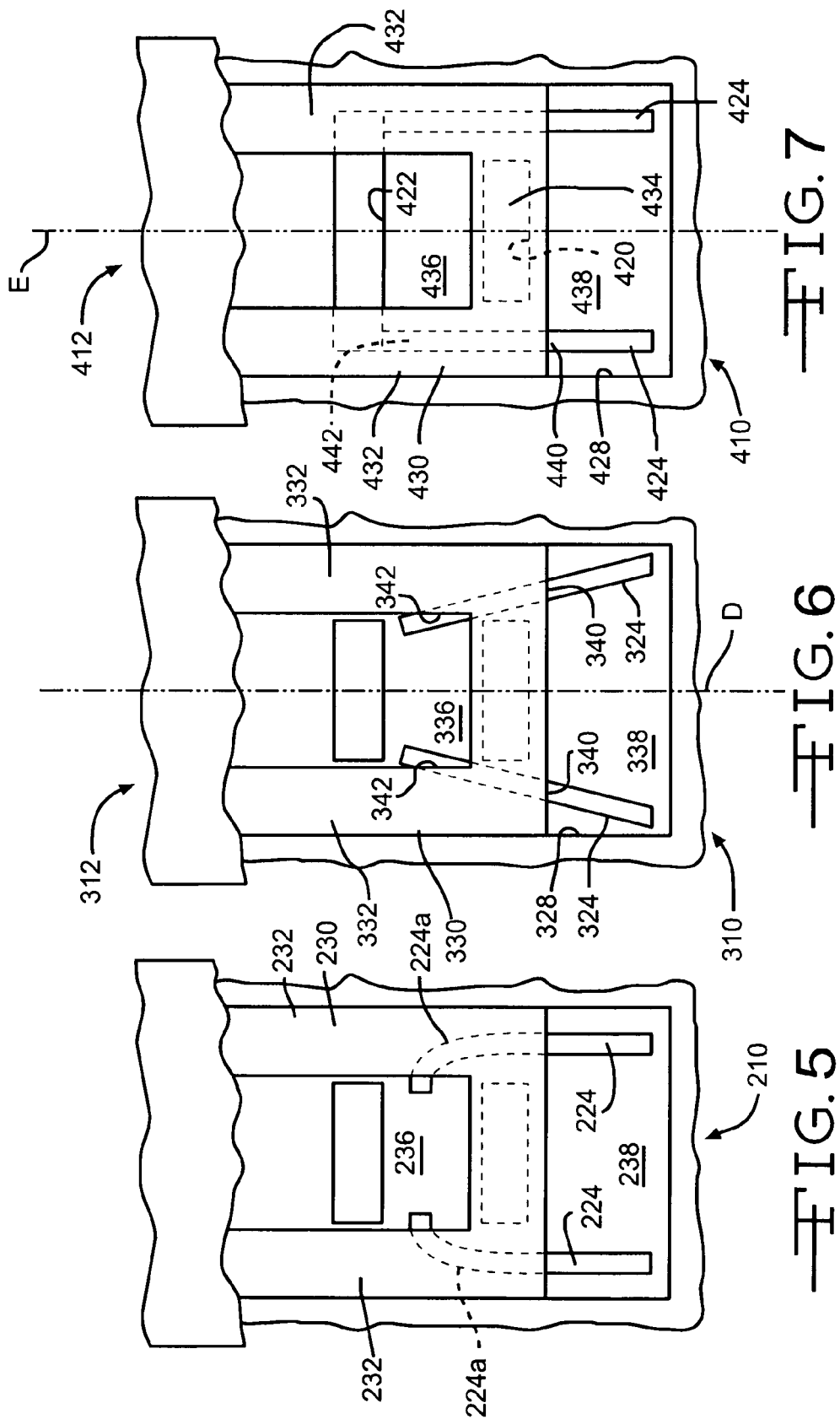

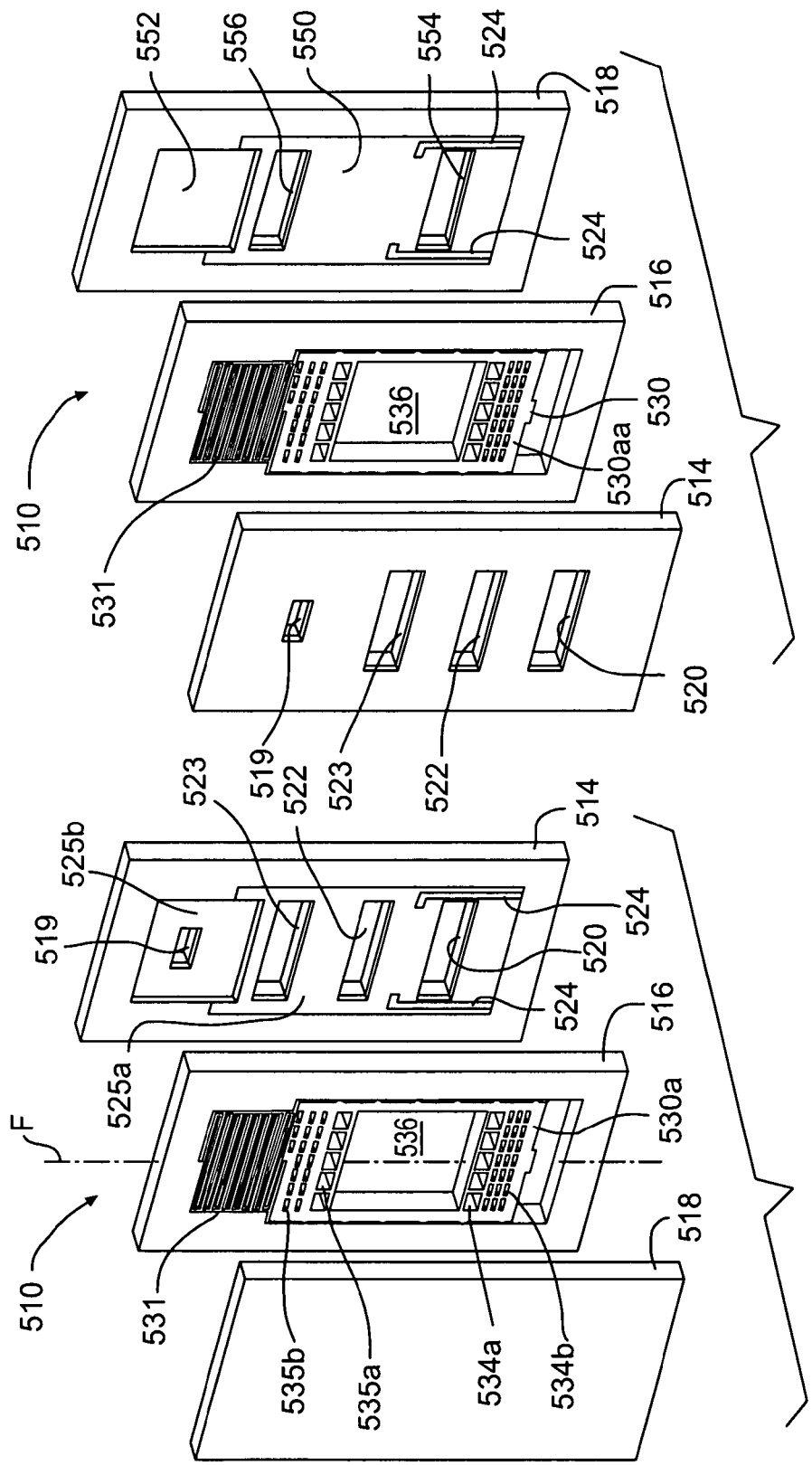

MICROVALVE DEVICE WITH IMPROVED FLUID ROUTING

BACKGROUND OF THE INVENTION

This invention relates in general to devices for MicroElectroMechanical Systems (MEMS), and in particular to a microvalve device in the form of a microvalve formed of a valve component defining a cavity, the valve component being movable within a microvalve body, the microvalve body defining a non-linear flow path that communicates with the cavity defined in the valve component.

MEMS (MicroElectroMechanical Systems) is a class of systems that are physically small, having features with sizes in the micrometer (micron) range. These systems have both electrical and mechanical components. The term "micromachining" is commonly understood to mean the production of three-dimensional structures and moving parts of MEMS devices. MEMS originally used modified integrated circuit (computer chip) fabrication techniques (such as chemical etching) and materials (such as silicon semiconductor material) to micromachine these very small mechanical devices. Today there are many more micromachining techniques and materials available. The term "micromachined device" as used in this application means a device having features with sizes in the micrometer range, and thus by definition is at least partially formed by micromachining. More particularly, the term "microvalve" as used in this application means a valve having features with sizes in the micrometer range, and thus by definition is at least partially formed by micromachining. The term "microvalve device" as used in this application means a micromachined device that includes a microvalve, and that may include other components. It should be noted that if components other than a microvalve are included in the microvalve device, these other components may be micromachined components or standard sized (larger) components. Similarly, a micromachined device may include both micromachined components and standard sized (larger) components.

Various microvalve devices have been proposed for controlling fluid flow within a fluid circuit. A typical microvalve device includes a displaceable member or valve component movably supported by a body for movement between a closed position and a fully open position. When placed in the closed position, the valve component substantially blocks or closes a first fluid port that is otherwise in fluid communication with a second fluid port, thereby preventing fluid from flowing between the fluid ports. When the valve component moves from the closed position to the fully open position, fluid is increasingly allowed to flow between the fluid ports.

U.S. Pat. No. 6,505,811, the disclosures of which are incorporated herein by reference, describes a microvalve device that consists of two microvalves, one microvalve acting as a pilot valve, and a second microvalve acting as a pilot-operated valve. Each of these microvalves is made of multiple layers of material which are micromachined and bonded together to form a microvalve body, and the various microvalve components contained therein.

In the microvalve acting as a pilot valve, the valve component is a pivoting component, and consists of a beam resiliently supported by the body at one end. In operation, an actuator forces the beam to bend about the supported end of the beam, moving from an unactuated position toward an actuated position. The beam is formed from an intermediate layer of material and pivots within a chamber defined by the intermediate layer and by the layers immediately adjacent to the intermediate layer. When the actuator is deenergized, the bending forces return the beam back toward the unactuated position. In this manner, a fluid flow path through a port in the body can be selectively blocked by movement of the beam between a position blocking the port and a position not blocking the port.

In the microvalve acting as a pilot operated microvalve, the valve component is a sliding component, and consists of a slider element formed from an intermediate layer of material. The slider element is guided so as to be able to reciprocate within a chamber defined by the intermediate layer and by the layers immediately adjacent to the intermediate layer. In operation, a control pressure in the form of pressurized fluid from the pilot microvalve acts on a first longitudinal end face of the slider element to urge the slider element to slide from an unactuated position toward an actuated position. In this manner, a fluid flow path through a port in the body can be selectively blocked by movement of the slider element between a position blocking the port and a position not blocking the port. In U.S. Pat. No. 6,505,811, the slider element is connected to a fixed portion of the intermediate layer by a spring which returns the slider element to the unactuated position upon a reduction in the fluid pressure exerted by the pilot microvalve. Additionally, fluid pressure can be applied to a second longitudinal end face of the slider element (opposite the first longitudinal end face) to act as a feedback pressure acting in opposition to the control pressure.

Various openings (vents, ducts, or apertures) may be formed perpendicularly (that is, perpendicular to the plane of movement within which the valve components are constrained to move) through the valve component of either a pivoting valve component, generally similar to the beam of the pilot microvalve described above, or through a sliding valve component, generally similar to the slider element of the pilot operated microvalve described above. One effect of such openings help prevent or diminish pressure imbalances between the perpendicularly opposed surfaces of the valve component, so that the valve components are not urged into "out of plane" movement so as to drag against layers of material which are adjacent to the intermediate layer from which the valve components are fabricated.

In the aforementioned U.S. Pat. No. 6,505,811, more than one embodiment of the invention involves a microvalve having a body defining at least two ports, and further defining a cavity within which a slider element is disposed. The slider element defines an aperture therethrough which is sized so that in an open position of the slider element, both ports are in fluid communication with the aperture of the slider element. In the open position, fluid can flow through one of the ports, longitudinally within the aperture of the slider element, and then out of the other port. In a closed position of the slider element though, the aperture of the slider element is no longer in fluid communication with one of the ports; the flow through that port is blocked by a portion of the slider element adjacent to that port.

In U.S. Pat. No. 6,694,998, the disclosures of which are incorporated herein by reference, a microvalve device of my invention is illustrated. The microvalve device is configured as a 3-way microvalve, having a first supply port, an output conduit, and a return port. In a pressure increase position, a slider element allows the fluid to flow from the first supply port to the output conduit. In a pressure hold position, the slider element isolates the output conduit from both the first supply port and the return port. The pressure decrease position allows fluid to flow from the output conduit to the return port. Pressure from the output conduit acts against a first axial end face of the slider element to provide pressure feedback. A single slider valve conduit provides this fluid communication between the output conduit and the first axial end face of the slider element.

SUMMARY OF THE INVENTION

The invention relates to a microvalve device for controlling fluid flow in a fluid circuit. The microvalve device comprises a body formed of multiple plates of material. An intermediate plate of the body has a cavity formed therein, the cavity having a longitudinal axis. At least a first port and a second port are formed in the body, which ports can communicate with the cavity. A slider element is movable within the cavity along the longitudinal axis to selectively substantially block and unblock the first port, thereby selectively controlling fluid communication between the first port and the second port within the microvalve device. The slider element substantially seals against the body to define a variable-volume region within the cavity, which variable-volume region varies in volume as the slider element moves. A non-linear fluid conduit is defined in a portion of the body that is formed from other than the intermediate plate. The non-linear fluid conduit provides fluid communication between the second port and the variable-volume region regardless of the position of the slider element. In an alternate embodiment, a linear fluid conduit is defined at an angle to the longitudinal axis in a portion of the body that is formed from other than the intermediate plate. In an alternate embodiment, a trench is defined in a plate of the body adjacent to the intermediate plate that provides fluid communication between a first point in fluid communication with the variable-volume region and a second point in fluid communication with the second port, a side portion of the slider element and the plate adjacent to the intermediate plate cooperating to enclose fluid in the trench between the first point and the second point. In an alternate embodiment, a first fluid conduit feeds pressure from the second port to the variable-volume region in a manner that pressure of the fluid within the first fluid conduit will exert a first force upon the slider element perpendicular to the axis of movement of the slider element; and a second fluid conduit feeds pressure from the second port to the variable-volume region in a manner that pressure of the fluid within the second fluid conduit will exert a second force, opposite in direction and substantially equal in value to the first force, upon the slider element.

Various objects and advantages of this invention will become apparent to those skilled in the art from the following detailed description of the preferred embodiments, when read in light of the accompanying drawings.

BRIEF DESCRIPTION OF THE DRAWINGS

FIG. 1 is an exploded view of a portion of a microvalve device having an improved routing for fluid passageways.

FIG. 2 is a top view of an intermediate layer and an adjacent layer of the microvalve device of FIG. 1, showing a slider element in a closed position.

FIG. 3 is a view similar to FIG. 2, showing the slider element in an open position.

FIG. 4 is a view similar to FIGS. 2 and 3, but showing a second embodiment of a microvalve device.

FIG. 5 is a view similar to FIG. 4, but showing a third embodiment of a microvalve device.

FIG. 6 is a view similar to FIG. 4, but showing a fourth embodiment of a microvalve device.

FIG. 7 is a view similar to FIG. 4, but showing a fifth embodiment of a microvalve device.

FIG. 10 is an exploded perspective view of the cover plate, mechanical plate and port plate of the microvalve device of FIG. 8, viewed with the cover plate closest.

FIG. 11 is a view similar to FIG. 10, except viewed with the port plate closest.

DETAILED DESCRIPTION OF THE PREFERRED EMBODIMENTS

Figure 4B:
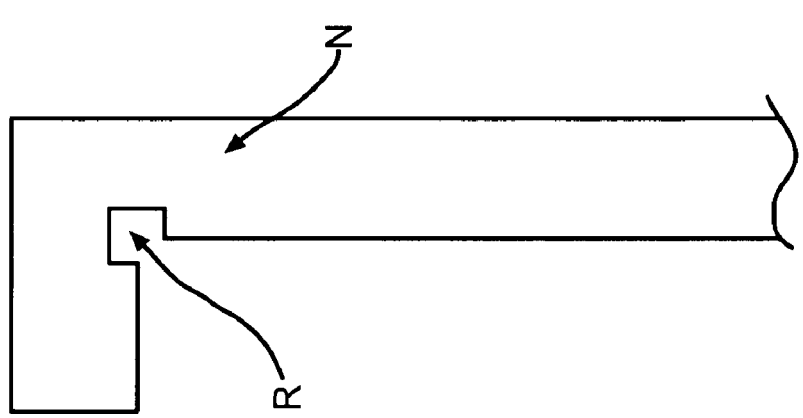
FIG. 4b is a view similar to that of FIG. 4a, but showing the device of FIG. 4 prior to etching the trench.

A first embodiment of a microvalve device for controlling fluid flow is shown generally at 10 in FIGS. 1, 2 and 3. The microvalve device 10 includes a body indicated generally at 12. The body 12 defines a longitudinal axis A, as will be discussed further below. The body 12 includes a first plate, embodied as a port plate 14, a second plate, embodied as a mechanical plate 16, and a third plate, embodied as a cover plate 18. The port plate 14 is a port plate, in that the port plate 14 is provided with at least one port (in this embodiment, two ports described below are shown) that is adapted to provide fluid communication with a fluid circuit (not shown). The mechanical plate 16 is the mechanical plate, in that the moving mechanical parts (described below) of the microvalve device 10 are disposed in the mechanical plate 16 (and indeed, are preferably formed from the mechanical plate 16. The cover plate 18 is a cover plate, in that the cover plate 18 covers at least a portion of the mechanical plate 16 and acts as a fluid boundary of the body 12. The mechanical plate 16 is attached to and between the port plate 14 and the cover plate 18, and is thus intermediate the port plate 14 and the cover plate 18. Preferably, each of the plates 14, 16, 18 is made of semiconductor material, such as silicon. Alternatively, one or more of the plates 14, 16, and 18 may be made of any other suitable material, such as glass, ceramic, aluminum, or the like. Any suitable process may be utilized to fix the plates 14, 16, and 18 together. The description regarding the materials of and the process of joining the plates 14, 16, and 18 also applies to the other embodiments of microvalve devices discussed below.

The term "non-planar" as used in this application means that the fluid flow, force, or other subject of the term has a significant component acting perpendicular to the parallel planes defined by the plates 14, 16, and 18. Other terms which may be used in this application include upper, lower, above, below, up, down and the like. These terms are defined in this application with respect to an arbitrary frame work in which the direction perpendicular to the mechanical plate 16 toward the port plate 14 is defined as "down" and the direction perpendicular to the mechanical plate 16 toward the cover plate 18 is defined as "up". This convention is for ease of discussion and is not intended as a limitation to the orientation of the devices described herein in actual use or as a limitation to the claims. The terms "inner" and "outer" are defined with respect to the relative closeness of the component under discussion to the longitudinal axis A, with an inner component being relatively closer to the longitudinal axis than an outer component.

In this disclosure, reference is sometimes made to a microvalve being "closed" or a port being "covered or "blocked". It should be understood that these terms mean that flow through the microvalve or the port is reduced sufficiently that any leakage flow remaining will be relatively insignificant in applications in which the microvalve devices described herein may be employed.

Still referring to FIGS. 1, 2, and 3, the port plate 14 defines a first port 20 and a second port 22. Additional ports may be provided (and may be seen in the last embodiment of a microvalve device illustrated and described in this disclosure), but are not needed to be discussed for a basic understanding of the concepts to be discussed with respect to FIGS. 1, 2, and 3. Accordingly, the view of the body 12 is only a partial view. The first port 20 is adapted for connection with a first fluid conduit (not shown). The second port 22 is adapted for connection with a second fluid conduit (also not shown). As will be discussed below, the microvalve device 10 is operated to selectively provide fluid communication between the first fluid conduit and the second fluid conduit through the first port 20 and the second port 22.

The port plate 14 further defines two fluid conduits in the form of two laterally spaced-apart trenches 24. The two trenches 24 defined in the port plate 14 being on either lateral side of the first port 20, spaced outwardly from the first port 20, and extending parallel to the longitudinal axis A of the body 12. The trenches 24 do not extend completely through the port plate 14.

The mechanical plate 16 has a fixed portion 26 which defines an elongate cavity 28 therein. The centerline (or longitudinal axis) of the cavity 28 is the longitudinal axis A. The cavity 28 extends completely through the mechanical plate 16. Within the cavity 28 is disposed a valve component in the form of a slider element 30. The slider element 30 includes two spaced-apart longitudinally-extending side portions 32, and an end portion 34 which joins the two side portions 32. The two side portions 32 and the end portion 34 cooperate to define sides of an aperture or opening 36 through the slider element 30 which encloses a volume in constant communication with the second port 22.

The slider element 30 can be moved between a closed position, illustrated in FIG. 2, in which the end portion 34 blocks the first port 20, and an open position, illustrated in FIG. 3, in which the end portion 34 uncovers the first port 20, permitting fluid communication between the first port 20 and the second port 22 via a fluid flow conduit within the opening 36 of the slider element 30. The slider element 30 can be moved between the open and closed positions thereof by any suitable means, including, for example, fluid pressure from a source of pressurized fluid (not shown) or a direct acting actuator (not shown) fixed to or otherwise operably coupled to move the slider element 30. Note that, in both the open and closed positions of the slider element 30, the trenches 24 in the port plate remain in fluid communication with the volume of fluid within the opening 36 in the slider element 30, and thus remain in fluid communication via that volume of fluid with the second port 22.

Portions of the cover plate 18 and the port plate 14 are fixed to the fixed portion 26 of the mechanical plate 16. The cover plate 18 thus cooperates with the port plate 14 and the fixed portion 26 of the mechanical plate 16 to form a pressure boundary about the cavity 28 defined in the mechanical plate 16.

A surface 30*a* of the slider element 30 faces and substantially seals against the adjacent surface of the cover plate 18. A second surface (not shown) is defined on the face of the slider element 30 which is opposite the surface 30*a*. This second surface faces, and substantially seals against the adjacent surface of the port plate 14. The respective portions of the second surface overlying each of the trenches 24 cooperate with the walls of the trench 24 to enclose the fluid conduit that is formed by the respective trench 24. The laterally outwardly facing surfaces 30*b* of the slider element 30 substantially seal against the adjacent laterally inwardly facing surfaces of the fixed portion 26 that define the cavity 28. An axial end face 30*c* of the slider element 30 cooperates with the fixed portion 26 to define a space with a variable volume. In other words, the slider element 30 substantially seals against the body 12 (i.e., to portions of the cover plate 18, the port plate 14 and the fixed portion 26 of the mechanical plate 26) to define a variable-volume region 38 within the cavity 28. The variable-volume region 38 varies in volume as the slider element 30 moves, as seen by comparing FIGS. 2 and 3.

In order to describe the operation of the first embodiment, assume the microvalve 10 is in a closed position, as illustrated in FIG. 2. The slider element 30 covers the first port 20, preventing fluid communication through the fluid flow conduit between the first port 20 and the second port 22. Pressure of the fluid communicating with the second port 22 is communicated to the variable-volume region 38 by way of the trenches 24 formed in the port plate 14 (covered by the slider element 30), where the pressure exerts a force on the axial end face 30*c*.

An actuation mechanism (not shown) causes the slider 30 to move into a position where the end portion 34 is no longer blocking the first port 22. Thus, the microvalve device 10 is now in an open position that allows fluid to communicate via the fluid flow conduit between the first port 20 and the second port 22. The first port 20 is only partially unblocked initially, but when the slider 30 moves to the full open position shown in FIG. 3, the first port 20 is fully unblocked. As the first port 20 is progressively unblocked and fluid flow between the first port 20 and the second port 22 can progressively increase. If the first port 20 is the source of pressurized fluid flowing through the microvalve device 10 from the first port 20 to the second port 22, pressure of the volume within the opening 36 may rise (depending upon the exact flow characteristics of the microvalve device 20 and the system (not shown) in which the microvalve device 20 is installed). This rising pressure of the volume in the opening 36 is communicated to the axial end face 30*c* of the slider 30 via the trenches 24. The pressure acting against the axial end face 30*c* can be used, for example, as a negative feedback mechanism for assisting in positioning the slider 30 and thus assisting in the control of the microvalve device 10.

The use of multiple fluid conduits in the form of multiple trenches 24 is an improved routing of fluid in the microvalve device 10. Among other benefits, in the event of debris blocking one of the trenches 24, the communication of pressure between the variable-volume region 38 and the volume within the opening 36 can continue through the other trench 24. Other benefits will be apparent to those of ordinary skill in the art, in light of this disclosure.

Referring now to FIG. 4, a second embodiment of the invention is shown in the form of a microvalve device 110. The microvalve device 110 is similar in structure and in function to the microvalve device 10, except as noted below. In this disclosure, features of the various embodiments which are generally similar in function or structure will have the same reference numbers, except that the alternate embodiments will have a reference number a factor of 100 (100, 200, etc.) greater than the first embodiment illustrated in FIGS. 1-3. Thus, for example, the microvalve device 110 of the alternate embodiment illustrated in FIG. 4 has a body 112, which is generally similar in structure and function to the body 12 of the microvalve device 10.

In the second embodiment, shown in FIG. 4, one can see that the body 112 includes a port plate 114, a mechanical plate 116, and a cover plate 118. The body 112 defines a longitudinal axis B, similar to the longitudinal axis A of the first embodiment. The port plate 114 defines a first port 120 and a second port 122. The port plate 114 also defines multiple fluid conduits in the form of a pair of trenches 124. Note that, as will be discussed below, the structure of the trenches 124 differs somewhat from the structure of the trenches 24, although the function is similar.

The mechanical plate 116 has a fixed portion 126; at least some regions of the fixed portion 126 are fixed to respective portions of the port plate 114 and to respective portions of the cover plate 118. The fixed portion 126 defines a cavity 128, with the axis B forming the centerline (longitudinal axis) of the cavity 128. A slider element 130 is disposed in the cavity 128, and reciprocates longitudinally along the axis B. The slider element 130 has an axial end face 130c. A pair of side portions 132 and an end portion 134 of the slider element 130 cooperate to define an opening 136 in the slider element 130. The opening 136 encloses a volume in constant communication with the second port 22. The slider element 130, the fixed portion 126, the cover plate 118, and the port plate 114 cooperate to define a variable-volume region 138.

Note that in the second embodiment, illustrated in FIG. 4, the first port 120 has substantially the same width as the second port 122, which is to say, extends substantially the full width of the opening 136 in the slider element. Also note that the first port 120 has substantially the same length as the second port 122. Thus, the flow area through the first port 120 is substantially the same as the flow area through the second port 122. In contrast, in the embodiment illustrated in FIGS. 1 through 3, although the length of the first port 20 is the same as that of the second port 22, the width of the first port 20 is less than that of the second port 22. Therefore, in the embodiment illustrated in FIGS. 1 through 3, the flow area of the first port 20 is less than that of the second port 22. Depending upon the design of the rest of the microvalve device 10, the reduced flow area of the first port 20 compared to that of the second port 22 may be the limiting factor on the rate of fluid flow through the microvalve device 10. If all other parameters are the same between the microvalve devices 10 and 110 (apart from the widths of the respective first ports 20, 120), since the flow area of the first port 120 and the flow area of the second port 122 of the microvalve device 110 are the same, the microvalve device 110 should be able to have a greater fluid flow rate between the first port 120 and the second port 122 that the microvalve device 10 is capable of between the first port 20 and the second port 22.

As indicated above, the structure of the trenches 124 differs somewhat from the structure of the trenches 24, although the function is similar. To accommodate the increased width of the first port 120 of the second embodiment, compared to the first port 20 of the first embodiment, the fluid conduits that are created by the trenches 124 are routed to avoid the first port 120 while still providing fluid communication between the variable-volume region 138 and the volume contained in the opening 136 in communication with the second port 122. Each illustrated trench 124 is a non linear trench. What is meant by this is that between a first point 140 at which the trench 124 communicates with a first volume, such as the variable-volume region 138 and a second point 142 at which the trench 124 communicates with a second volume, such as the volume contained in the opening 136 in communication with the second port 122, does not follow a straight line between the first point 140 and the second point 142. In the embodiment illustrated in FIG. 4, each trench 124 is composed of two inter-communicating straight segments 124a, 124b set at an angle to one another. For each of the two trenches 124 shown, the segment 124a communicates with the volume contained in the opening 136 in communication with the second port 142 and with the respective segment 124b; the segment 124b communicates with the respective segment 124a and with the variable-volume region 138. Each of the segments 124b extends parallel to the axis B, and extends under the side portions 132 of the slider element 130. Each of the segments 124a extends perpendicular to the axis B.

This arrangement of segments of the trenches 124 is influenced to some extent by the grain structure of the material from which the port plate 114 is composed. In a preferred embodiment, the material from which the port plate 114 is formed is single crystal silicon, which is subjected to KOH (Potassium Hydroxide) etching to form the first port 120, the second port 122, and the trenches 124.

Figure 4A:
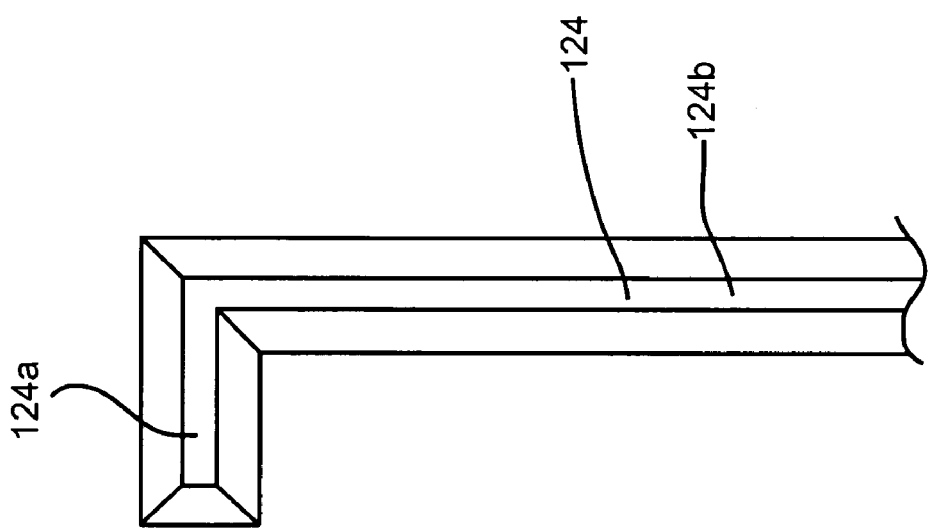
FIG. 4a is an enlarged view of a portion of a trench of the device of FIG. 4.
Figure 9:
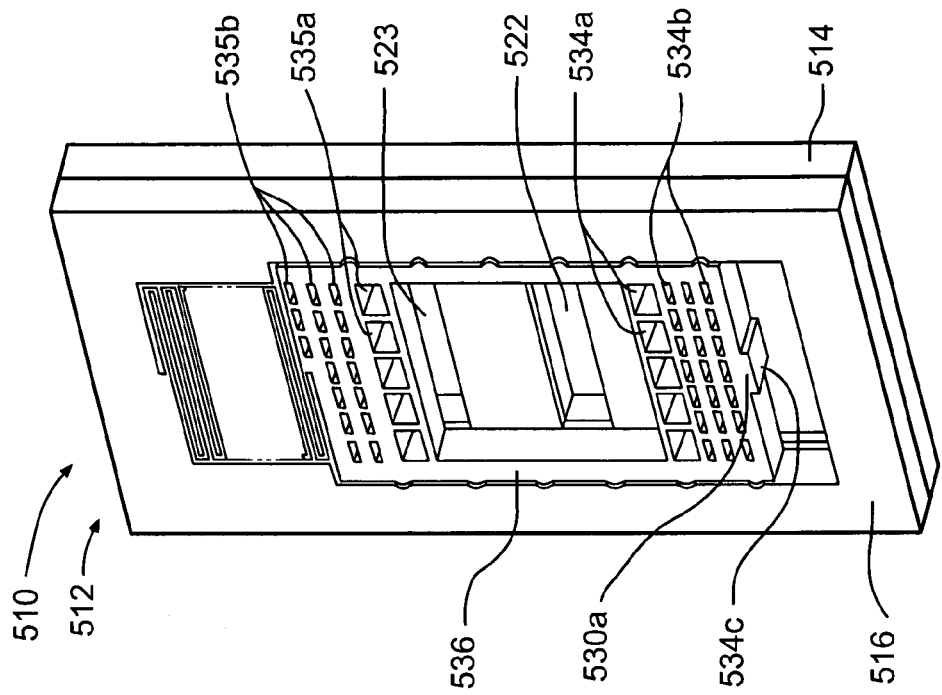
FIG. 9 is a perspective view of the mechanical plate and port plate of the microvalve device of FIG. 8.
Figure 8:
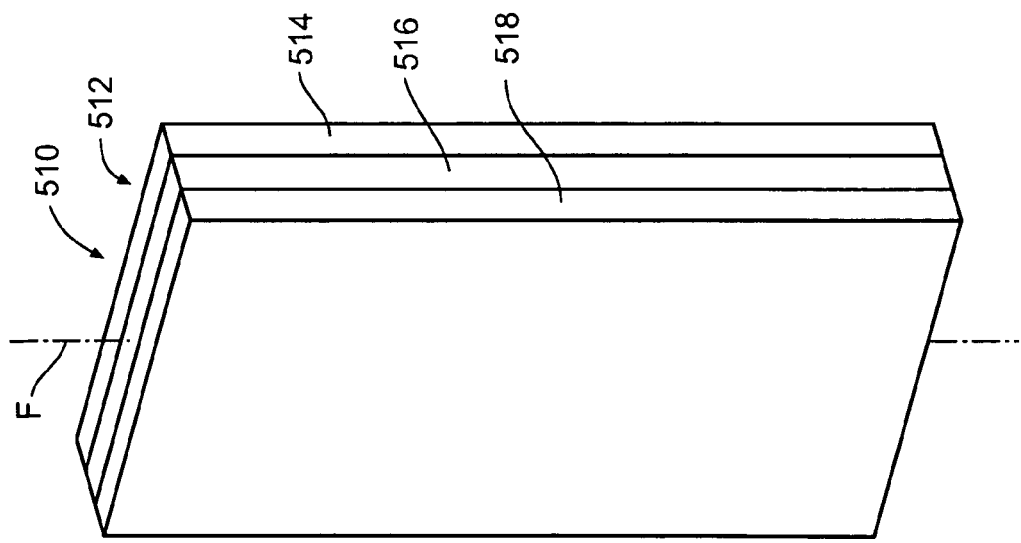
FIG. 8 is a perspective view of a sixth embodiment of a microvalve device.

Owing to the crystal structure of the silicon, etching the two segments 124a and 124b of each trench 124 aligned with the crystal structure is typically an easier manufacturing process than etching, for example, a single trench following an arcuate path. Nevertheless, it will be appreciated that when using a KOH etching process, etching a right-angle turn in a trench involves more than simply applying the etching chemical along the desired final track. FIG. 4a is an enlarged view of one of the trenches 124, at the location of the right-angle portion of the trench 124. Preliminarily, note that the cross-section of the trench 124 created by the KOH etching process is typically an isosceles trapezoid, with the walls of the trench 124 at other than right angles to the bottom surface of the trench 124, so that the walls are visible when seen from above, as seen in FIG. 4a. This detail is omitted in FIG. 4, for the purposes of clarity.

To form the right angle turn in the trench 124, and not have the inner corner of the angle rounded by "over-etching" the area from two adjacent sides, a compensation is made in the mask that sets up the areas to be etched and the areas to be coated by a resist layer to resist etching. One proposal for this compensation is illustrated in FIG. 4b, which illustrates the port plate 114 prior to the etching process, in the same area as illustrated in FIG. 4a. The area inside the line, indicated at N, has no resist applied, and will be etched by exposure to KOH. The area outside the line, including the area indicated at "R", is coated with a resist layer. In the area indicated at R, the resist layer will retard the etching process so that, even though the area indicated at R is etched from several sides, the area will not be "over etched", and the end result will be that the trench 124 maintains a uniform width in the area of the right angle. Of course, the exact configuration for this compensation depends upon several factors, including the desired degree of preciseness in forming the right angle.

However, it is contemplated that the trenches 124 may be formed in various non-linear shapes of any combination or number of arcuate or linear trench segments, particularly if other materials are utilized or other manufacturing processes are utilized, such as Deep Reactive-Ion Etching (DRIE). This is illustrated in FIG. 5, which is a view of a third embodiment of a microvalve device 210 otherwise identical to the microvalve device 110, except that the microvalve device 210 is provided with two trenches 224. Each of the trenches 224 communicates with a variable-volume region 238 and communicates with a volume contained in an opening 236 in a slider element 230 having two side portions 232. Each of the trenches 224 is non-linear as each of the trenches 224 has a respective segment 224a that describes an arcuate path under a respective one of the side portions 232 of the slider element 230.

It is also contemplated that the trenches 112 of the microvalve device 110 could be linear and yet still be routed around the first opening 120. This is illustrated in FIG. 6, which is a view of a fourth embodiment of a microvalve device 310 otherwise identical to the microvalve device 110, except that the microvalve device 310 is provided with two trenches 324. Each of the trenches 324 communicates with a variable-volume region 338 and communicates with a volume contained in an opening 336 in a slider element 330 having two side elements 332. The slider element 330 is disposed to reciprocate longitudinally in a cavity 326. Each of the trenches 324 is linear as each of the trenches 324 follows a straight line between a first point 340, at which the trench 324 communicates with a first volume, such as the variable-volume region 338 and a second point 342 at which the trench 324 communicates with a second volume, such as the volume contained in the opening 336 in communication with a second port 322. However the straight line followed by each trench 324 extends at a respective angle to a longitudinal axis D of the cavity 326, and of the body 312, and extends under the side portions 332 of the slider element 330. Thus, each trench 324 is non-parallel to the longitudinal axis D.

FIG. 7 illustrates a fifth embodiment of a microvalve device 410 otherwise identical to the microvalve device 110, except that the microvalve device 410 is provided with two trenches 424 and a second port 422 which is wider than a first port 420. The second port 422 communicates with a volume contained in an opening 436 defined in a slider element 430. The opening 436 is partially defined by two side portions 432 and an end portion 434 of the slider element 430. Like the first port 120 in the second embodiment illustrated in FIG. 4, the first port 420 extends the full width between the two side portions 432. Unlike the second port 122, the second port 422 is wider than the opening 436 in the slider 430, and extends under the side portion 432. Since the portions of the second port 422 that underlie the side portions 432 are substantially removed from the flow path between the first port 420 and the second port 422, the first port 420 has substantially the same flow area as the second port 422 for any fluid flowing therebetween, similar to the second embodiment shown in FIG. 4. Each of the trenches 424 communicates with a variable-volume region 438 and communicates with the volume contained in the opening 436. The slider element 430 is disposed to reciprocate longitudinally in a cavity 426. Each of the trenches 424 is linear as each of the trenches 424 follows a straight line between a first point 440, at which the trench 424 communicates with a first volume, such as the variable-volume region 438 and a second point 442 at which the trench 424 communicates with a second volume, such as the volume of fluid contained in the second port 422. The straight line followed by each trench 424 is parallel to a longitudinal axis E of the cavity 426, and the body 412, similar to the first embodiment shown in FIGS. 1-3. However, each trench 424 extends under a respective one of the side portions 432 of the slider element 430, thus allowing the first port 420 to be as wide as the opening 436 in the slider, yet still routing the trenches 424 past the first port 420.

The first five embodiments described above were illustrated in simplified form to better highlight the described aspects of the invention. FIGS. 8 through 14 illustrate in somewhat more detail a sixth embodiment of a microvalve device, indicated generally at 510. The microvalve device 510 includes a body indicated generally at 512. The body 512 defines a longitudinal axis F, as will be discussed further below. The body 512 includes first plate, embodied as a port plate 514, a second plate, embodied as a mechanical plate 516, and a third plate, embodied as a cover plate 518. The port plate 514 is a port plate, in that the port plate 514 is provided with ports (described below) that are adapted to provide fluid communication with a fluid circuit (not shown). The mechanical plate 516 is the mechanical plate, in that the moving mechanical parts (described below) of the microvalve device 510 are disposed in the mechanical plate 516 (and indeed, are preferably formed from the mechanical plate 516. The cover plate 518 is a cover plate, in that the cover plate 518 covers at least a portion of the mechanical plate 516 and acts as a fluid boundary of the body 512. The mechanical plate 516 is attached to and between the port plate 514 and the cover plate 518, and is thus intermediate the port plate 514 and the cover plate 518. Preferably, each of the plates 514, 516, 518 is made of semiconductor material, such as silicon, and more preferably, made of single crystal silicon. Alternatively, one or more of the plates 514, 516, 518 may be made of any other material suitable for a particular application, such as glass, ceramic, aluminum, or the like. Any suitable process may be utilized to fix the plates 514, 516, and 518 together.

Referring to FIGS. 10 through 15, the port plate 514 defines a control port 519, a first port 520, a second port 522, and a third port 523. Additional ports may be provided. The first port 520 is adapted for connection with a first fluid conduit (not shown). The second port 522 is adapted for connection with a second fluid conduit (not shown). The third port 523 is adapted for connection with a third fluid conduit (not shown). The control port 519 is adapted for connection with a source of selectively applied pressurized fluid, the purpose of which will be discussed below. As will also be discussed below, the microvalve device 510 is operated to selectively provide fluid communication between the first fluid conduit and the second fluid conduit through the first port 520 and the second port 522, and between the second fluid conduit and the third fluid conduit through the second port 522 and the third port 523. Note that in this embodiment, as most clearly illustrated in FIG. 10, the first port 520 has substantially the same width as the second port 522 and the third port 523, which is to say each of the three ports 520, 522, 523 extends substantially the full width of the opening 536 in the slider element 530. Also note that the first port 520 has substantially the same length as each of the second port 522 and the third port 523. Thus, the flow area through the first port 520 is substantially the same as the flow area through the second port 522 which, in turn, is substantially the same as the flow area through the third port 523.

The port plate 514 further defines two fluid conduits in the form of two laterally spaced-apart trenches 524. The two trenches 524 are defined in the port plate 514 on either lateral side of the first port 520, spaced outwardly from the first port 520. The trenches 524 do not extend completely through the port plate 514. Each trench 524 is composed of a straight segment 524a extending parallel to the axis F, and a straight segment 524b communicating with and set at a right angle to the segment 524a, similar to the trenches 124 of FIG. 4.

As best seen in FIGS. 10, 12C, 13C, and 15C, the surface of the port plate 514 that faces the mechanical plate has a first region 525a that is recessed slightly (on the order of 0.5 to 2 micrometers relative to the outer periphery of the port plate 514). The trenches 524, the first port 520, the second port 522, and the third port 523 are formed in the region 525a. The surface of the port plate 514 that faces the mechanical plate 516 has a second region 525b that is recessed somewhat more than the region 525b (on the order of 20 to 100 micrometers relative to the outer periphery of the port plate 514). The port 519 is formed in the region 525b. The purpose of the recesses 525a and 525b will be explained below.

The mechanical plate 516 has a fixed portion 526 which defines an elongate cavity 528 therein. The centerline (or longitudinal axis) of the cavity 528 is the longitudinal axis F. The cavity 528 extends completely through the mechanical plate 516. Within the cavity 528 is disposed a valve component in the form of a slider element 530. The slider element 530 is connected to the fixed portion 526 by a spring 533. Preferably, the slider element 530 and the spring are integrally formed from the mechanical plate 516.

The slider element 530 includes two spaced-apart longitudinally-extending side portions 532, a first end portion 534, and a second end portion 535. The first end portion 534 and the second end portion 535 are opposite longitudinal ends of the slider element 530. The second end portion 535 is joined to the spring 531. The first end portion 534 and the second end portion 535 join respective longitudinal ends of each of the two side portions 532. The two side portions 532, the first end portion 534, and the second end portion 535 cooperate to define sides of an aperture or opening 536 through the slider element 530 which encloses a volume in constant communication with the second port 522.

The first end portion 534 is provided with one or more bores 534a through the thickness of the mechanical plate 516, which will be further discussed below. The first end portion 534 is also provided with one or more bores 534b through the thickness of the mechanical plate 516, which be further discussed below. The bores 534a are arranged adjacent the opening 536 in the slider element 530. The bores 534b are arranged between the location of the bores 534a and the axial end face 530c of the slider element 530. Similarly, the second end portion 535 is provided with one or more bores 535a through the thickness of the mechanical plate 516, which will be further discussed below. The second end portion 535 is also provided with one or more bores 535b through the thickness of the mechanical plate 516, which will be further discussed below. The bores 535 are arranged adjacent the opening 536 in the slider element 530. The bores 535 are arranged between the location of the bores 534a and the axial end face of the slider element 530 to which the spring 531 is attached.

A boss 534c is formed on the axial end face 530c of the slider element 530. The purpose of the boss 534c is to ensure a minimum size of the variable-volume region 538, such that the trenches 524 can always communicate with the variable-volume region 538 (i.e., prevent the slider element 530 from completely covering the first segment 524a of the trench 524). This can best be understood by reference to FIG. 12, where the boss 534c is shown in contact with the fixed portion 526 of the mechanical plate 514, but a small variable-volume region 538 is still present, and communicating with the trench 524 at a point 540.

Figure 15:
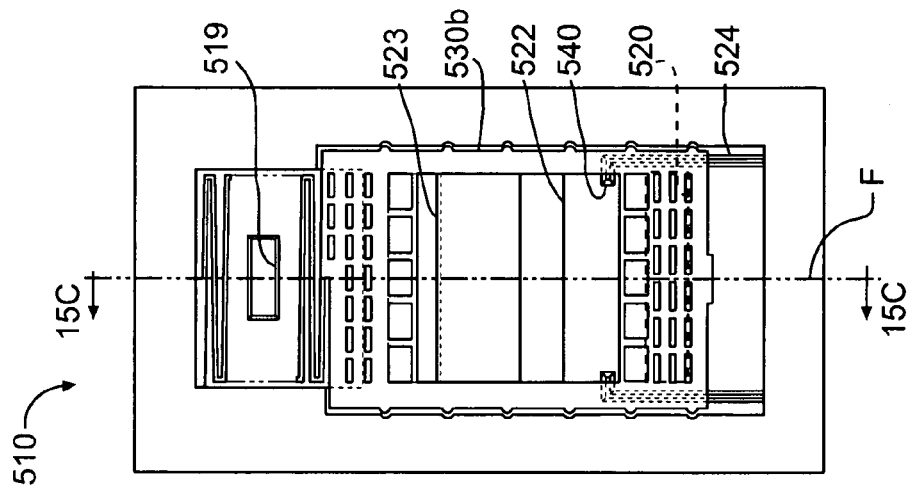
FIG. 15 is a view similar to FIG. 12, except showing the slider element in a dump position with no control pressure applied.

Preferably the laterally outwardly facing surfaces 530b are provided with a plurality of alternating narrow peaks 530bp, and broad valleys 530bv. Referring to FIG. 15, the as-fabricated position of the slider element 530 and spring 531 is shown. Typically, the slider element 530 is created by etching a boundary line through the mechanical plate 516 to separate the slider element 530 from the fixed portion 526 of the mechanical plate 516. During this process, corresponding narrow valleys are formed on the laterally inwardly facing walls of the fixed portion 526 opposite each narrow peak 530bp. Similarly, corresponding broad peaks are formed on the laterally inwardly facing walls of the fixed portion 526 opposite each broad valley 530bv. When the slider element 530 is moved from the as-fabricated position illustrated in FIG. 15, the narrow peaks 530bp of the slider element 530 move into close proximity to the broad peaks of the fixed portion 526, further reducing any leakage between the laterally outwardly facing surfaces 530b of the slider element 130 and the adjacent regions of fixed portion 526 (around the slider element 530).

A first (upper) surface 530a of the slider element 530 faces and substantially seals against the adjacent surface of the cover plate 518. A second (lower) surface 530aa (see FIG. 11) is defined on the face of the slider element 530 opposite the surface 530a, and faces and substantially seals against the adjacent surface of the port plate 514. Note that the phrase "substantially seals" as used in this application means that the two surfaces of interest (here, the second surface 530aa and the adjacent surface of the port plate 514) are in sufficiently close proximity that leakage of fluid between the surfaces, while extant, is negligible for the application in which the microvalve device 510 is utilized. The laterally outwardly facing surfaces 530b of the slider element 530 substantially seal against the adjacent laterally inwardly facing surfaces of the fixed portion 526 that define the cavity 528. An axial end face 530c of the slider element 530 cooperates with the fixed portion 526 to define a space with a variable volume. In other words, the slider element 530 substantially seals against the body 512 (i.e., to portions of the cover plate 518, the port plate 514 and the fixed portion 526 of the mechanical plate 526) to define a variable-volume region 538 within the cavity 528. The variable-volume region 538 varies in volume as the slider element 530 moves, as seen by comparing FIGS. 12, 13, and 15 or FIGS. 12C, 13C, and 15C.

As best seen in FIGS. 11, 12C, 13C, and 15C, the surface of the cover plate 518 that faces the mechanical plate has a first region 550 that is recessed slightly (on the order of 0.5 to 2 micrometers relative to the outer periphery of the cover plate 518). The surface of the cover plate 518 that faces the mechanical plate 516 has a second region 552 that is recessed somewhat more than the region 550 (on the order of 20 to 100 micrometers relative to the outer periphery of the cover plate 518). A plurality of trenches 524, similar to the trenches 524 formed in the port plate 514, is formed in the first region 550. Each of the trenches 524 in the cover plate 518 is on an opposite side of the mechanical plate 516 from a corresponding one to the trenches 524 in the port plate 514, for the purposes of pressure balancing, as will be discussed below.

Two laterally extending troughs 554 and 556 are also formed in the first region 550. The first trough 554 has a similar area to, and is disposed on an opposite side of the mechanical plate 516 from the first port 520. The second trough 556 has a similar area to, and is disposed on an opposite side of the mechanical plate 516 from the third port 523.

The purposes of the troughs 554, 556 include pressure balancing and flow force balancing, as will be further discussed below. The cover plate 518 and the port plate 514 are each fixed to the fixed portions 526 of the mechanical plate 516. The cover plate 518 thus cooperates with the port plate 514 and the fixed portion 526 of the mechanical plate 516 to form a pressure boundary about the defined in the mechanical plate 516.

When the port plate 514, the mechanical plate 516, and the cover plate 518 are assembled to form the body 512, the perimeter of the lower face of the mechanical plate 516 is bonded or otherwise fixed in a leak-tight manner to the perimeter of the upper face of the port plate 514, and the perimeter of the upper face of the mechanical plate 516 is bonded or otherwise fixed in a leak-tight manner to the perimeter of the lower face of the cover plate 518.

The first recessed region 525a in the port plate 514 is disposed directly opposite from the first recessed region 550 in the cover plate 518. The recesses 525a and 550 help ensure that the slider element 530 is free to move, but are relatively shallow to minimize leakage between the slider element 530 and the adjacent surfaces of the port plate 514 and the cover plate 518. The second recessed region 525b in the port plate 514 is disposed directly opposite from the recessed region 552 in the cover plate 518. The recesses 525b and 552 are part of a control chamber 560, most clearly seen in FIGS. 12C, 13C, 14, and 15C. The control chamber 560 is in fluid communication with the control port 519. The control chamber 560 is exposed to the axial end face of the second end portion 535 of the slider element, such that pressure in the control chamber 560, acting over the area of the axial end face of the second end portion 535 urges the slider element toward the first position shown in FIGS. 12 and 12C. The control chamber 560 contains the spring 531, but the recessed regions 525b and 552 are sufficiently recessed that not only does the spring not engage or drag against either the port plate 514 or the cover plate 518, but also fluid can flow relatively freely through the control port 519, in the control chamber 560, and around the spring 531 to effect sufficiently rapid change in the position of the slider element 530.

The illustrated embodiment of the microvalve device 510 is a three-way microvalve. In a typical application, the first port 520 would be connected to a source of pressurized fluid (not shown), such as a pump discharge, the second port 522 would be a load port, connected to supply fluid to a load (not shown) at a pressure which is to be controlled by the microvalve device 510, and the third port 523 would be a return port, connected to a relatively low pressure region (not shown) such as a reservoir or pump suction. A control signal in the form of pressurized fluid would be provided at varying pressures through the control port 519. The control signal may be supplied to the microvalve device 510 by, for example, a pilot valve which operates to control the pressure supplied in response to an electrical signal, or, to use another example, may be pressurized fluid obtained from a particular point of an industrial process (such as a air conditioning process).

Figure 12:
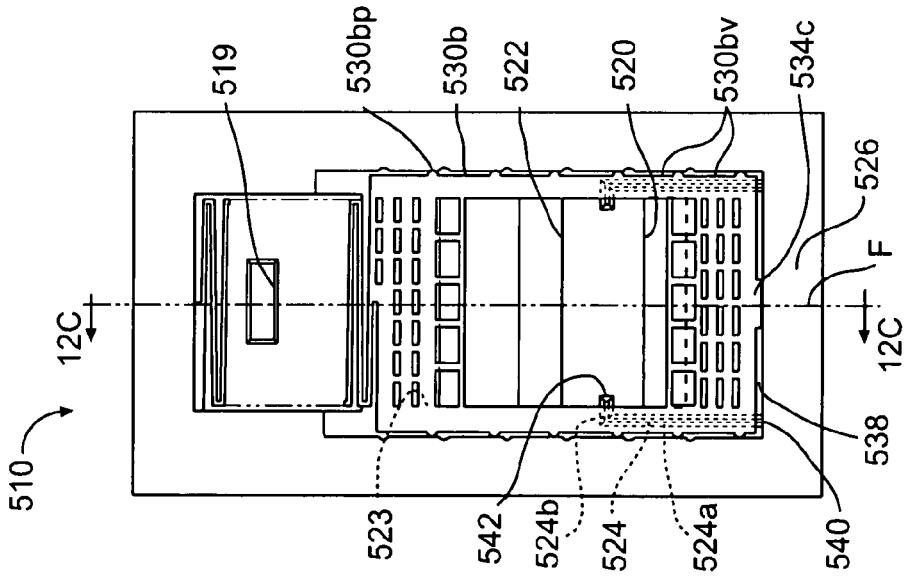
FIG. 12 is a top view of the mechanical plate and the port plate of the microvalve device of FIG. 8, showing a slider element positioned with full control pressure applied.
Figure 12C:
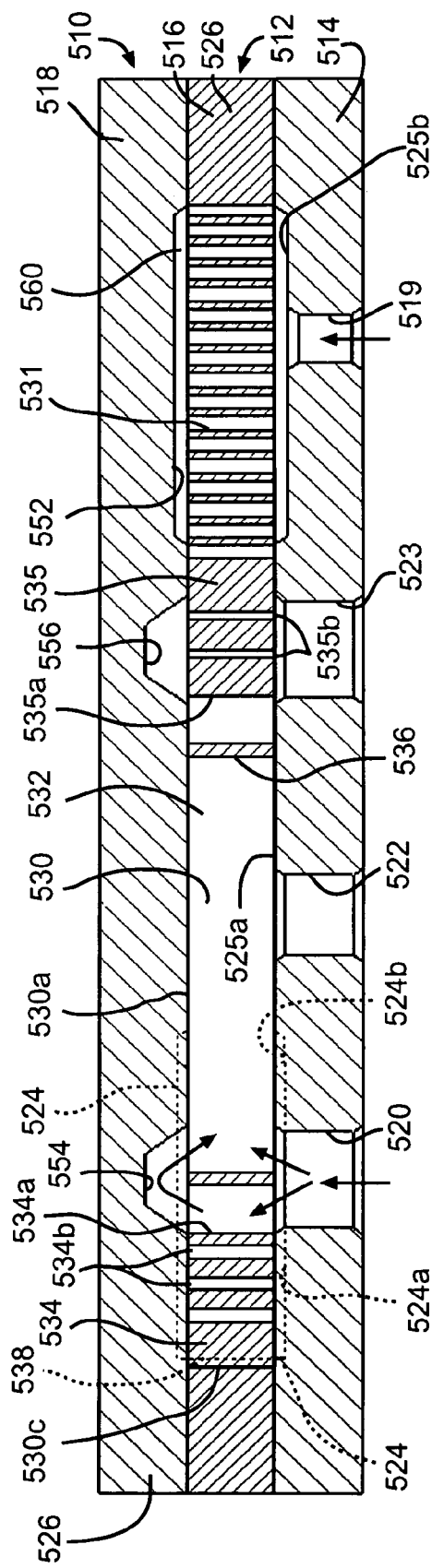
FIG. 12C is a sectional view taken along the line 12C-12C of FIG. 12.

By supplying relatively high pressure fluid (compared to the pressure of fluid in the variable-volume region 538) into the control port 519, pressure in the control chamber 560 acting against the second end portion 535 will urge the slider element 530 to be moved to a first, pressure increase position, illustrated in FIGS. 12 and 12C, stretching the spring 531. In this first position, the second end portion 535 blocks the third port 523 but the first end portion 534 permits fluid communication between the first port 520 and the second port 522. Note, as illustrated by the flow arrows in FIG. 12C, fluid flowing in from the first port 520 is divided, with a first stream of fluid passing directly from the first port 520 into the opening 536 of the slider element 530, and a second stream of fluid passing from the first port 520 upward through the flow openings 534a and into the trough 554, where the second stream of fluid is then re-directed into the opening 536 of the slider element to join the first stream in flowing out of the second port 522.

As fluid is supplied from the second port 522 to the load, and pressure rises in the second port 522, this pressure is fed to the variable-volume region 538 through the fluid conduits formed by the trenches 524 in the port plate 514 and the cover plate 518. When fluid pressure in the variable-volume region 538 approaches the fluid pressure in the control chamber, the longitudinally acting fluid forces will begin to cancel out, and the slider element 530 will move away from the first position.

Figure 13:
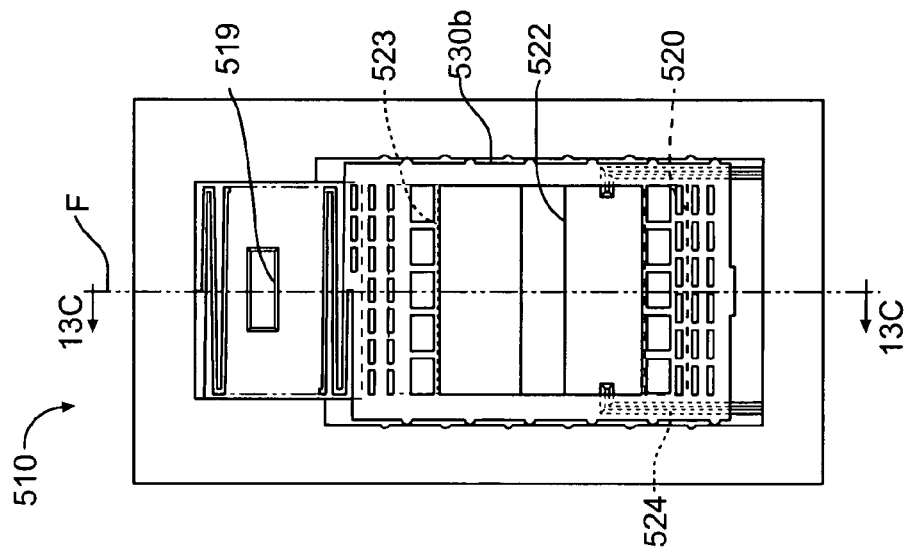
FIG. 13 is a view similar to FIG. 12, except showing the slider element in a mid (modulating) position with a partial control pressure applied.
Figure 13C:
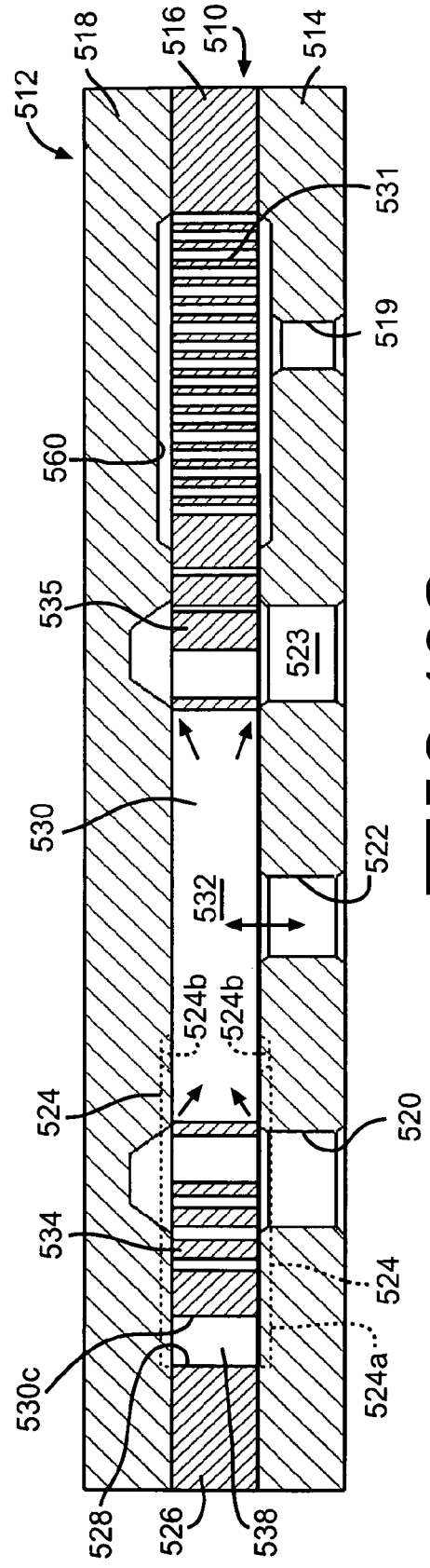
FIG. 13C is a sectional view taken along the line 13C-13C of FIG. 13.
Figure 14:
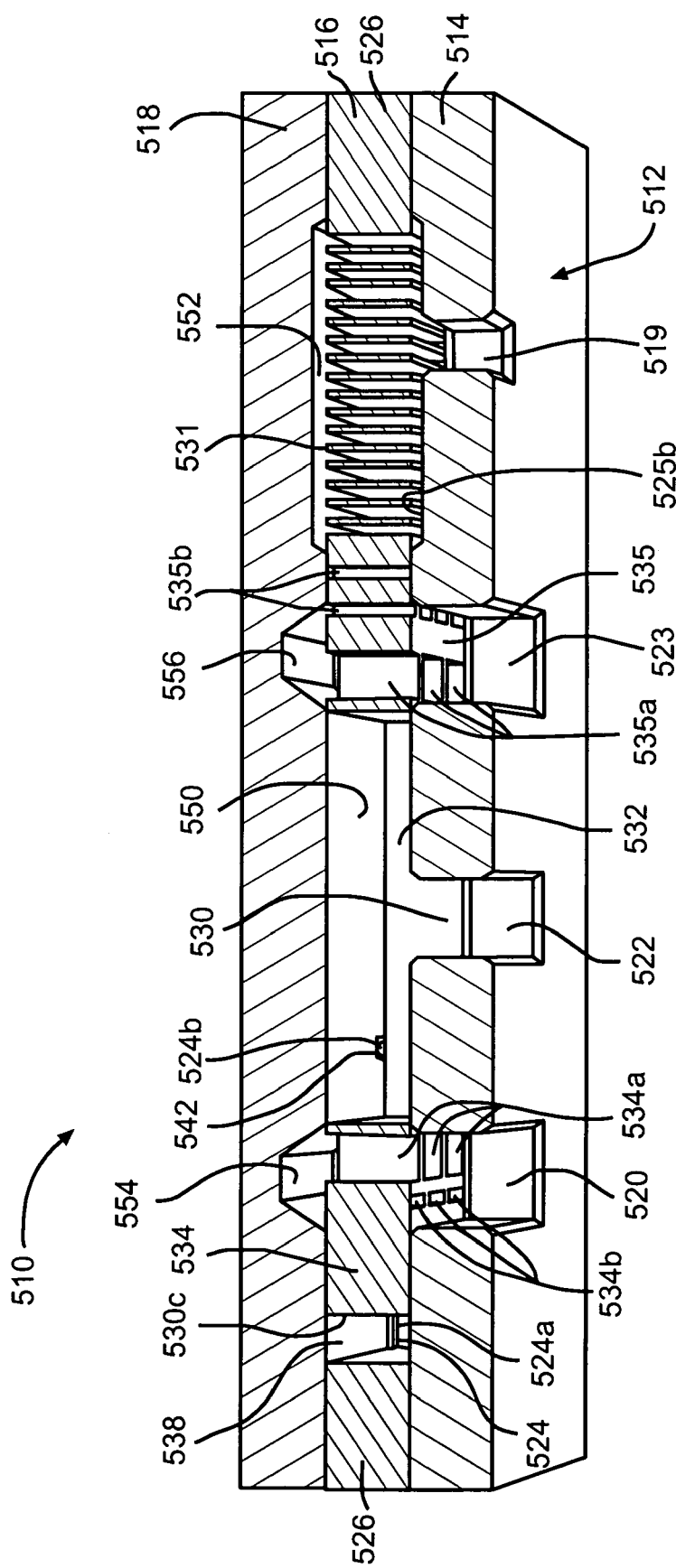
FIG. 14 is a perspective sectional view taken along the line 13C-13C of FIG. 13.

When the forces acting longitudinally on the slider element 530 balance, the slider element 530 will move to a second, maintaining position, illustrated in FIGS. 13, 13C, and 14, in which the first end portion 534 blocks the first port 520, and the second end portion 535 still blocks the third port 523, so that the second port 522 is substantially isolated and maintains a generally constant pressure. As indicated by the small flow arrows, a negligible amount of leakage may flow from the first port 520 into the volume of fluid connected to the second port 522. However, another negligible amount of leakage may flow from the volume of fluid connected to the second port 522 to the third port 523. As with any valve, the acceptability of a particular amount of leakage flow in a particular application is one factor to be considered by those designing a system in which a valve is to be installed.

Figure 15C:
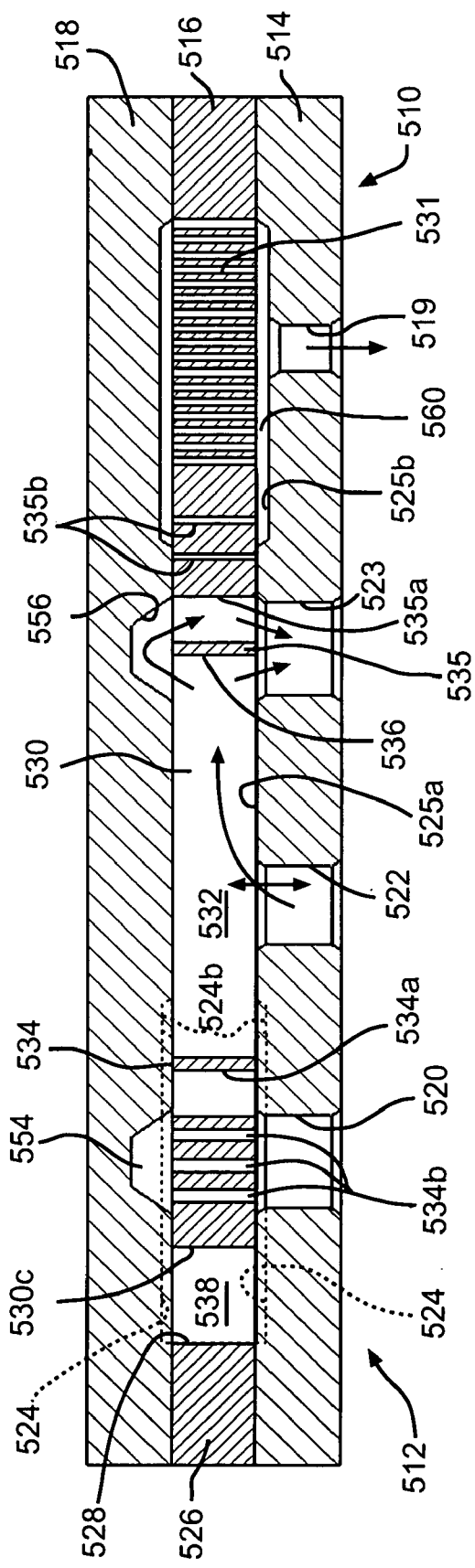
FIG. 15C is a sectional view taken along the line 15C-15C of FIG. 15.

By lowering the pressure of the control signal to lower pressure of the fluid in the control port 519 (compared to the pressure of fluid in the variable-volume region 538), pressure in the variable-volume region 538, acting against the first end portion 534 will urge the slider element 530 to be moved to a third, pressure reduction position, illustrated in FIGS. 15 and 15C, returning the spring 531 to a relaxed condition. In this third position, the first end portion 534 blocks the first port 520 but the second end portion 535 permits fluid communication between the first port 520 and the second port 522. Note, as illustrated by the flow arrows in FIG. 12C, fluid flowing in from the volume of fluid within the opening 536 in the slider element 530 to the third port 523 is divided, with a first stream of fluid passing directly from the opening 536 of the slider element 530 into the third port 523, and a second stream of fluid passing from the first port 520 upward into the trough 554 where the second stream of fluid is then re-directed downwardly through the flow openings 535a to join the first stream in flowing out of the third port 523. In this manner, pressure at the second port 522 is reduced.

Note that, in all of the first, second, and third positions of the slider element 530, the trenches 524 in the port plate and the cover plate 518 remain in fluid in communication with the volume of fluid within the opening 536 in the slider element 530, and thus provide uninterrupted fluid communication between the variable-volume region 538 and the second port 522. As the pressure at the second port 522 falls, pressure in the variable-volume region 538 will also fall, due to the communication provided by the trenches 524. If the pressure in the variable-volume region 538 falls to that in the control chamber 560, then the slider element 530 will return to the second position shown in FIGS. 13, 13C, and 14.

In order to describe the operation of the first embodiment, assume the microvalve 510 is in a closed position, as illustrated in FIG. 52. The slider element 530 covers the first port 520, preventing fluid communication between the first to port 520 and the second port 522. Pressure of the fluid communicating with the second port 522 is communicated to the variable-volume region 538 by way of the fluid conduits 524 formed in the port plate 514, where the pressure exerts a force on the axial end face 530*c*.

An actuation mechanism (not shown) causes the slider 530 to move into a position where the end portion 534 is no longer blocking the first port 522. Thus, the microvalve device 510 is now in an open position that allows fluid to communicate between the first port 520 and the second port 522. The first port 520 is only partially unblocked initially, but when the slider 530 moves to the full open position shown in FIG. 3, the first port 520 is fully unblocked. As the first port 520 is progressively unblocked, and fluid flow between the first port 520 and the second port 522 can progressively increase. If the first port 520 is the source of pressurized fluid flowing through the microvalve device 510 from the first port 520 to the second port 522, pressure of the volume within the opening 536 may rise (depending upon the exact flow characteristics of the microvalve device 520 and the system (not shown) in which the microvalve device 520 is installed). This rising pressure of the volume in the opening 536 is communicated to the axial end face 530*c* of the slider 530 via the trenches 524. The pressure acting against the axial end face 530*c* can be used, for example, as a negative feedback mechanism for assisting in positioning the slider 530 and thus assisting in the control of the microvalve device 510.

The microvalve represented here is a pressure reducing/relieving microvalve made entirely of silicon. It receives a command pressure from a pilot pressure microvalve (or other suitable source of pressure) and reproduces that pressure at a port connected to a load that requires that pressure. The pressure produced by the pilot could be applied directly to the load but in many instances the load will require high flow rates not available from the pilot microvalve. Instead, it is contemplated that a pilot-operated pressure control microvalve (such as the microvalve device 530) could beneficially be used, since a pilot-operated microvalve can be constructed to actuate a movable valve element (such as the slider element 530) with a high force over a longer distance that is typically economically practical with a direct acting microvalve, allowing the pilot-operated microvalve to accommodate much larger flow rates to a target load.

In summary, the silicon microvalve device 510 has several advantages over previous such types of microvalves. The basic operation of the microvalve device begins when the command pressure (control signal) is applied to one end of a spool (slider element) formed in an intermediate layer of a three (or more) layer microvalve device as shown in the figures, and discussed above. The command pressure is equal to the pressure desired to be supplied to the load. Prior to the application of the command pressure, the load may be higher or lower than the commanded pressure. The load pressure is ported (via the trenches) to the opposite end of the slider element (in the variable-volume region) and the load pressure is in continuous communication with that end of the slider element. If the command pressure is higher than the existing load pressure, the slider element will be urged toward the feed-back end (toward the position shown in FIGS. 12 and 12C, where the variable-volume is at minimal size). This motion will increase communication of the load with the pressure source (connected to the first port) and will raise the pressure at the load (connected to the second port) and at the feed-back end of the slider element (in the variable-volume region via the trenches). An equilibrium condition will be reached where the pressures on the control chamber end and the feed-back end of the slider element are equal. The time to reach equilibrium will depend on the volume of fluid that must be sent to the load to raise the load pressure to the command pressure.

The microvalve device will typically be connected to a manifold of some sort to communicate fluid from a supply of pressurized fluid, to and from the load, and then to the return line. I have considered silicon microvalves that communicate load pressure to the feed-back (variable-volume region) end of the slider element through an external manifold. However, the microvalve device of this disclosure makes this communication internally to the silicon plates. This does two things: First, it reduces the number of connections to the manifold making the manifold simpler and easier to manufacture. This increases spacing between the remaining connection making it easier to attach the microvalve to the manifold and make an effective seal between connections. Second, providing this communication internal to the microvalve provides damping due to small size of the channel communicating between the load pressure and the feed-back end of the slider element. The communication channel (trench 524) as shown in the drawings has an "L" shape. This allows the main part of the channel to reside between a section of the slider element 530 and a section of the adjacent port plate 514. Only one such channel may be required for the operation of the microvalve device 510 in some applications. However, the version of the invention embodied by the microvalve device 510 has four channels (trenches). For pressure balance across the thin dimension (between the faces 530*a* and 530*aa*) of the slider element 630, I have discovered that it is frequently desirable to have a respective communication channel (trench) exposed to both the face 530*a* and the face 530*aa*. Two channels can provide the functional attributes (pressure and flow capability) normally desired, and avoid a pressure imbalance across the slider element 530. There are two more channels shown bilaterally symmetrically disposed across the microvalve device 510. These are not required for the primary function of for pressure balance (i.e., pressure feedback). Adding additional identical fluid conduits providing communication between the second port 532 and the variable-volume region 538 will lessen the amount of damping on the longitudinal movement of the slider element 530 and allow for faster pressure response. This may or may not be desirable, depending on the application.

The microvalve device 510 is also an improvement over previous microvalves in the method of directing flow through the microvalve device 510. As previously described, and as best seen in FIGS. 12C, 13C, 14, and 15C, the incoming flow passing through the first port 520 is split into two channels as it encounters the slider element 530. One stream of flow directly enters the load pressure cavity (the volume within the opening 536 in the slider element 530) while the other stream of flow is ported via the first bores 534*a* through the thickness of the slider element 530, through the trough 554 in the cover plate 518, and then down into the load pressure cavity of the slider element 530.

Three things are accomplished by thus directing the fluid. First, the trough 554 carrying fluid in the cover plate 518 provides pressure balance across the thickness of the slider element 530, helping to ensure low friction losses and low valve hysteresis. The first bores 534*a* are sufficiently large that there is little pressure drop between the inlet port 520 and the trough 554. As discussed before, the trough 554 has essentially the same area and shape as the inlet port 520. Therefore, the static upward force caused by pressurized fluid in the inlet port 530 acting on the slider element 530 will be largely counterbalanced by the static downward force caused by pressurized fluid in the trough 554 acting on the slider element 530.

Secondly, having flow from the port 520 in the port plate 514 and from the trough 554 in the cover plate 518 balances jetting forces across the thickness of the microvalve (due to the slider element 530 throttling the flow of fluid going straight from the port 520 to the load pressure cavity, a force is generated acting to move the slider element perpendicular to the axis F; the design of the slider element 530 and the trough 554 causes a similar throttling of flow which generates a counterbalancing force). With the net force acting perpendicular to the axis F thus being limited, the design helps ensure low friction and low hysteresis.

Third, because the fluid stream is throttled at two locations on the slider element 530 (carried through both the cover plate 518 and directly from the port plate 514), the stroke of the microvalve device 530 is only half of what would be required if flow were allowed from only the port plate 514 (i.e., throttling only occurred at one location on the slider element). This reduction in required stroke has many benefits. One benefit is that the spring 531 attaching the slider element 530 to the fixed portion of the mechanical plate 516 does not have to stretch as far (only about half as far) to accommodate the total stroke of the microvalve device 510. This allows the spring 531 to be smaller and thus the total size of the microvalve device 530 can be smaller. Furthermore, consider that the shorter stroke of the microvalve device 510 allows smaller ports (less longitudinal length). This added space can be used to either make the microvalve 510 smaller or to increase the spacing between ports (which decreases leakage, among other benefits).

When the microvalve device 530 is at equilibrium, the pressure in the control chamber 560, the feed-back chamber (the variable-volume region 538) and the load chamber in communication with the second port 522 are substantially equal. This means that there is substantially no leakage or tendency to leak through the clearances between members separating these chambers. As discussed before, there is a tendency to leak from the supply port 520 to the load chamber (load port 522) and/or from the load port 522 to the return port 523. This leakage can create a pressure imbalance across the thickness of the slider element 530 in the region between the supply port 520 and the load chamber and between the load chamber and the return port 523. To prevent the possibility of this pressure imbalance, series of channels (the second bores 534b and the second bores 535b) are cut through the slider element 530 to insure that pressure across the thickness of the slider element 530 in these regions is uniform. If leakage occurs, for example, directly between the load chamber and the return port (but not between the load chamber and the trough 556) pressure could build up below the lower surface 530aa of the second end portion 535 of the slider element 530, tending to lift the slider element into contact with the cover plate 518. However, as the leakage flow encounters the second bores 535b through the second end portion 535, the pressure of the leakage flow will be vented through the second bores 535b to the upper face 530a, substantially equalizing the pressures top and bottom.

It will be appreciated in light of the above disclosure that the fluid conduits that are defined as the trenches 524 in the port plate 514 and the cover plate 518, respectively, are covered by the adjacent portions of the slider element 530 which is a part of the mechanical plate 516. Therefore, it is clear that the slider element 530 cooperates with the port plate 514 and the cover plate 518 to confine any flow of fluid within the fluid conduits in the trenches 524. However, as used in this application, this covering by the slider element is not considered to be defining the fluid conduit in the mechanical plate 516. It is the trench 524 defined in the port plate 514 and the cover plate 518 that is to be considered by definition to be the fluid conduit, since, if there were no such trench, there would be no fluid conduit. Thus the fluid conduits 524 are each defined in a portion of the body 512, which portion (the port plate 514 and the cover plate 518 respectively) of the body 512 is not formed from the intermediate mechanical plate 516. However, one aspect of my invention is to utilize a first fluid conduit to feed pressure from a load port of a microvalve device to an axial end of a slider element of the microvalve device, in manner that pressure of the fluid within the first fluid conduit will exert a first force perpendicular to the axis of movement of the slider element, and to counteract this force by utilizing a second fluid conduit to feed pressure from the load port to the axial end of the slider element in a manner that pressure of the fluid within the second fluid conduit will exert a second force opposite in direction and substantially equal in value to the first force upon the slider element. Such an arrangement can be realized in the manner described above with respect to the sixth embodiment, in that a trench 524 is provided in the port plate 514, and exposes the slider element 530 to pressure within the trench 524 which would tend to urge the slider element 530 upwardly to rub against the cover plate 518, and in that a mirror image trench 524 is provided in the cover plate 518 which exposes the slider element 530 to pressure within the trench which would tend to urge the slider element 530 downwards to rub against the port plate 514, so that the two forces tend to cancel each other. It should also be noted, although not previously discussed, it is specifically contemplated that such an arrangement (that is, the arrangement described with respect to the microvalve device 510) of at least one trench in a port plate and another trench in a cover plate with the fluid in the trenches exerting counterbalancing forces on the slider element, can be incorporated into many microvalve devices, including the microvalve devices 10, 110, 210, 310, and 410 described above.

Figure 16:
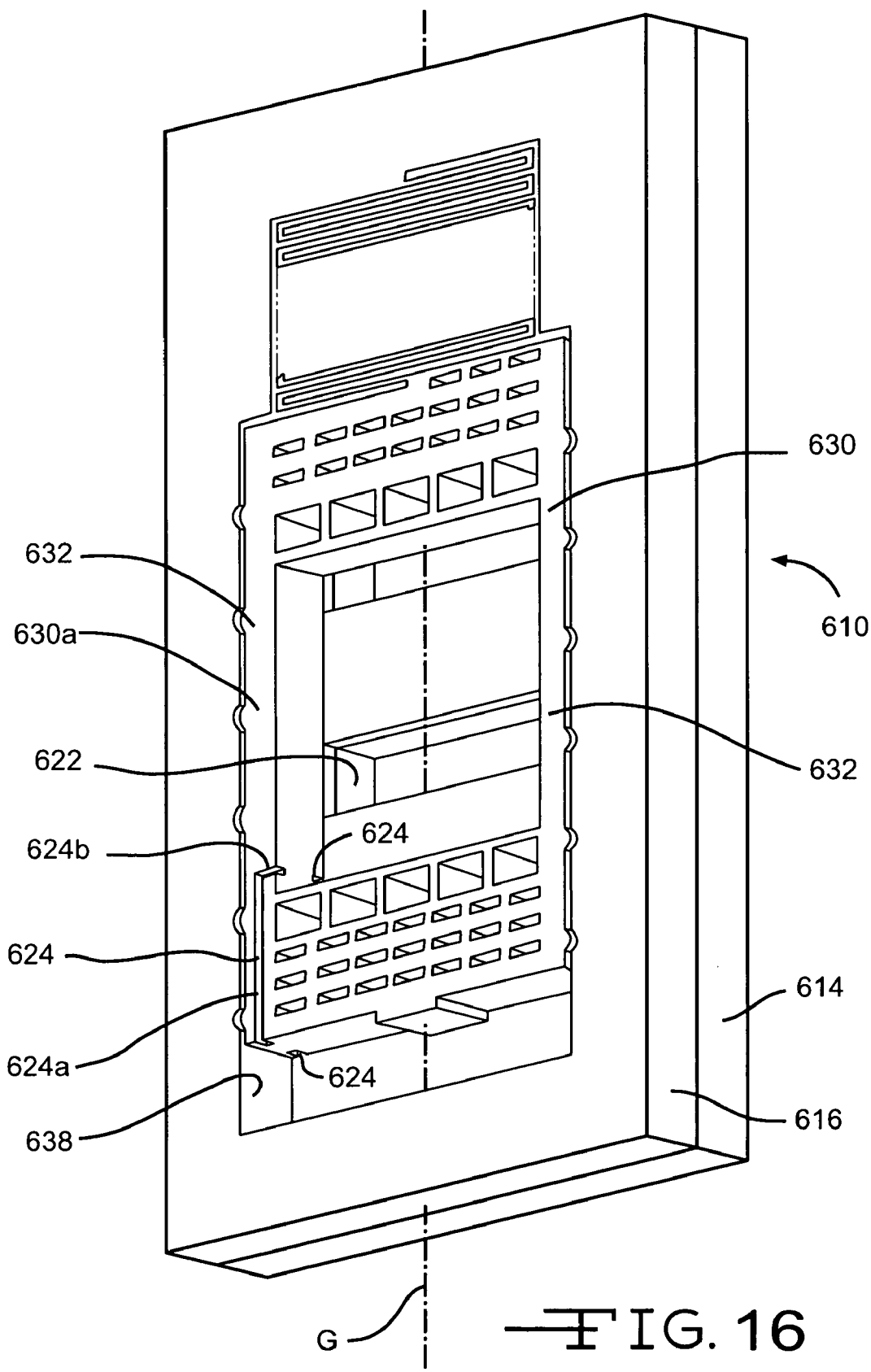
FIG. 16 is a perspective view similar to that of FIG. 9 of a seventh embodiment of a microvalve device.

It is also contemplated that an arrangement of at least one pair of trenches with the fluid in the trenches exerting counterbalancing forces on the slider element could be realized by incorporating the trenches into the slider element. Such an arrangement is illustrated in FIG. 16. FIG. 16 illustrates an arrangement very similar to that shown in FIG. 9, in that illustrated microvalve device, indicated generally at 610, is identical to the microvalve device 510 illustrated in FIG. 9, except as will now be discussed. The microvalve device 610 has a port plate 614 which is identical to the port plate 514 except that no trenches like the trenches 524 are formed in the port plate 614. Similarly, the microvalve device 610 has a cover plate (not shown) which is identical to the cover plate 518 except that no trenches like the trenches 524 are formed in the cover plate for the microvalve device 610. The microvalve device 610 has a slider element 630 identical to the slider element 530, except that a trench 624 is formed in the upper surface 630a of the slider element 630.

The trench 624 formed in the upper surface 630a communicates at one end thereof with a variable-volume region 638 identical to the variable-volume region 538. The trench 624 formed in the upper surface 630a is composed of a straight segment 624a extending parallel to the centerline axis G, and a straight segment 624b communicating with and set at a right angle to the segment 624a. The segment 624b is also constantly in communication with the port 622, so that the trench 624 formed in the upper surface 630a carries the pressure of the port 622 to the variable-volume region 638. The open top of the trench 624 formed in the upper surface 630a is covered by the cover plate (not shown). This arrangement exposes the slider element 630 to pressure within the trench 624 formed in the upper surface 630a which would tend to urge the slider element 630 downwards to rub against the port plate 614, which could impair the operation of the microvalve device 10. However, another trench 624 is formed in the lower surface (not shown, but opposite the upper surface 630a) of the slider element 630. The trench 624 in the lower surface of the slider element 630 provides communication between the port 622 and the variable-volume region 638, is identical in length, width, and cross-section to the trench 624 in the upper surface 630a, and thus contains the same pressure, which pressure acts over an equivalent amount of area, to exert a force which would tend to urge the slider element 630 upwards to rub against the cover plate 618. However, the forces exerted by the fluid in the two trenches 624 act with equal magnitude and in opposite directions, so that they counterbalance one another. Note that there is only one pair of trenches 624 shown. There is typically no need for another set of trenches, though another set could be installed in the other side portion 632 if desired for redundancy, or to change the damping associated with fluid flow through the trenches 624.

In accordance with the provisions of the patent statutes, the principle mode of operation of this invention have been explained and illustrated in its preferred embodiments. However, it must be understood that this invention may be practiced otherwise than as specifically explained and illustrated without departing from its spirit or scope.

LIST OF REFERENCE NUMBERS USED

A longitudinal axis of body 12
10 microvalve device
12 body
14 port plate
16 mechanical plate
18 cover plate
20 first port
22 second port
24 trenches (fluid conduits)
26 fixed portion of mechanical plate
28 cavity in mechanical plate
30 slider element
   30a upper surface of slider element
   30b laterally outwardly facing surfaces of slider element
   30c axial end face of slider element
32 side portions of slider element
34 end portion of slider element
36 opening in slider element
38 variable-volume region
B longitudinal axis of body 112
N area not covered by etch resist
R area covered by etch resist
110 microvalve device
112 body
114 port plate
116 mechanical plate
118 cover plate
120 first port
122 second port
124 trenches (fluid conduits)
   124a first segment of trench
   124b second segment of trench
126 fixed portion of mechanical plate
128 cavity in mechanical plate
130 slider element
   130a upper surface of slider element
   130b laterally outwardly facing surfaces of slider element
   130c axial end face of slider element
132 side portions of slider element
134 end portion of slider element
136 opening in slider element
138 variable-volume region
140 first point
142 second point
210 microvalve device
224 trenches (fluid conduits)
   224a first segment of trench
230 slider element
232 side portions of slider element
236 opening in slider element
238 variable-volume region
D longitudinal axis of body 312
310 microvalve device
312 body
324 trenches (fluid conduits)
328 cavity in mechanical plate
330 slider element
332 side portions of slider element
336 opening in slider element
338 variable-volume region
340 first point
342 second point
E longitudinal axis of body 412
410 microvalve device
412 body
420 first port
422 second port
424 trenches (fluid conduits)
426 fixed portion of mechanical plate
428 cavity in mechanical plate
430 slider element
432 side portions of slider element
434 end portion of slider element
436 opening in slider element
438 variable-volume region
440 first point
442 second point
F longitudinal axis of body 512
510 microvalve device
512 body
514 port plate
516 mechanical plate
519 control port
518 cover plate
520 first port
522 second port
523 third port
524 trenches (fluid conduits)
   524a first segment of trench
   524b second segment of trench
525a first recessed region on port plate
525b second recessed region on port plate
526 fixed portion of mechanical plate
528 cavity in mechanical plate
530 slider element
   530a upper surface of slider element
   530aa lower surface of slider element
   530b laterally outwardly facing surfaces of slider element
      530bv broad valleys of slider
      530bp peaks of slider
   530c axial end face of slider element
531 spring
532 side portions of slider element 534 first end portion of slider element
  534a first bores
  534b second bores
535 second end portion of slider element (spring end)
  534a first bores
  534b second bores
536 opening in slider element
538 variable-volume region
540 first point
542 second point
550 first recessed region
552 second recessed region
554 trough in cover plate opposite first port
556 trough in cover plate opposite third port
560 control chamber

What is claimed is:

1. A microvalve device comprising:
   a body formed of multiple plates of material, an intermediate plate of the body having a cavity defined therein, the cavity having a longitudinal axis, at least a first port and a second port being defined in the body, which ports can communicate with the cavity;
   a slider element movable within the cavity along the longitudinal axis of the cavity to selectively substantially block and unblock the first port, thereby selectively controlling fluid communication between the first port and the second port within the microvalve device, the slider element substantially sealing against the body to define a variable-volume region within the cavity, which variable-volume region varies in volume as the slider element moves; and
   a fluid conduit being defined in a portion of the body, which portion of the body is not formed from the intermediate plate, the fluid conduit providing fluid communication between the second port and the variable-volume region regardless of the position of the slider element, the fluid conduit being at least one of non-linear and non-parallel to the longitudinal axis of the cavity.

2. The microvalve device of claim 1 further comprising:
   a port plate forming a portion of the microvalve body, the port plate being fixed to the intermediate plate, at least one of the first port and the second port being defined by the port plate, the fluid conduit being defined in the port plate.

3. The microvalve device of claim 2 further comprising:
   a cover plate forming a portion of the microvalve body, the cover plate being fixed to the intermediate plate.

4. The microvalve device of claim 3, wherein a second fluid conduit is defined in the cover plate, the second fluid conduit providing fluid communication between the second port and the variable-volume region regardless of the position of the slider element, the second fluid conduit being at least one of non-linear and non-parallel to the longitudinal axis of the cavity.

5. The microvalve device of claim 2, wherein a second fluid conduit is defined in the port plate, the second fluid conduit providing fluid communication between the second port and the variable-volume region regardless of the position of the slider element, the second fluid conduit being at least one of non-linear and non-parallel to the longitudinal axis of the cavity.

6. The microvalve device of claim 5, wherein the fluid conduit and the second fluid conduit are defined laterally outwardly of and spaced apart from the first port.

7. The microvalve device of claim 6 further comprising:
   a cover plate forms a portion of the microvalve body, the cover plate being fixed to the intermediate plate;
   a third fluid conduit defined in the cover plate, the third fluid conduit providing fluid communication between the second port and the variable-volume region regardless of the position of the slider element, the third fluid conduit being at least one of non-linear and non-parallel to the longitudinal axis of the cavity; and
   a fourth fluid conduit defined in the cover plate, the fourth fluid conduit providing fluid communication between the second port and the variable-volume region regardless of the position of the slider element, the fourth fluid conduit being at least one of non-linear and non-parallel to the longitudinal axis of the cavity, the fourth fluid conduit being spaced apart from the third fluid conduit.

8. The microvalve device of claim 2 wherein the fluid conduit comprises a trench defined in the port plate, the trench having a first portion and a second portion which is not co-axial with the first portion.

9. The microvalve device of claim 8 wherein the first portion of the trench defines a linear path which is parallel to the longitudinal axis of the cavity.

10. The microvalve device of claim 8 wherein at least one of the first portion and the second portion of the trench defines an arcuate path.

11. The microvalve device of claim 2 wherein the fluid conduit comprises a trench in the port plate, the trench defining a linear path which is not parallel to the longitudinal axis of the cavity.

12. The microvalve device of claim 2, wherein the slider element comprises a first side portion, a second side portion, and at least one end portion which cooperates with the first and second side portions to define an opening through the slider element, which opening contains a volume in constant fluid communication with the second port and in constant fluid communication with the fluid conduit, the fluid conduit comprising a trench in the port plate which cooperates with the first side portion to form the fluid conduit between the variable volume region and the volume contained in the opening through the slider element.

13. A microvalve device comprising:
    a body defining a first port and a second port and a fluid flow conduit between the first port and the second port;
    a slider element movable within the body along a longitudinal axis to selectively block fluid communication through the fluid flow conduit between the first port and the second port, the slider element having an axial end face which cooperates with the body to define a variable-volume region, which variable-volume region varies in volume as the slider element moves; and
    multiple fluid conduits being defined in at least one of the body and the slider element, each fluid conduit providing fluid communication between and the variable-volume region and one of the second port and a portion of the fluid flow conduit in continuous fluid communication with the second port, such that, in any position of the slider element, any fluid pressure existing at the second port is transmitted via the fluid conduit to exert a force on the axial end face of the slider element.

14. The microvalve device of claim 13, wherein the first port is disposed between the second port and the variable-volume region.

15. The microvalve device of claim 14, wherein each fluid conduit is at least one of non-linear and non-parallel to the longitudinal axis of the cavity.

16. The microvalve device of claim 13, wherein the body defines a third port, the microvalve device being configured as a 3-way microvalve, such that in a first position, the slider element permits fluid communication between the first and second ports and blocks fluid communication between the third and second ports, in a second position, the slider element permits fluid communication between the third and second ports and blocks fluid communication between the first and second ports, and in a third position, the slider element blocks fluid communication between the first and second ports and blocks fluid communication between the third and second ports.

17. The microvalve device of claim 16, wherein the axial end face is a first axial end face, the slider element having a second axial end face at an opposite end from the first axial end face, the second axial end face cooperating with the body to define a second variable-volume region, which second variable-volume region varies in volume as the slider element moves, and wherein the body defines a control port in fluid communication with the second variable-volume region.

18. The microvalve device of claim 17, further comprising a spring operatively coupling the body and the slider element.

19. The microvalve device of claim 13, wherein the axial end face of the slider element has a boss formed thereon.

20. A microvalve device comprising:
a body formed of multiple plates of material, an intermediate plate of the body having a cavity defined therein, the cavity having a longitudinal axis, at least a first port and a second port being defined in the body, which ports can communicate with the cavity;
a slider element movable within the cavity along the longitudinal axis of the cavity to selectively substantially block and unblock the first port, thereby selectively controlling fluid communication between the first port and the second port within the microvalve device, the slider element substantially sealing against the body to define a variable-volume region within the cavity, which variable-volume region varies in volume as the slider element moves, the slider element having side portions that cooperate to define an opening in the slider element; and
a trench defined in a plate of the body adjacent to the intermediate plate providing fluid communication between a first point in fluid communication with the variable-volume region and a second point in fluid communication with the second port, a side portion of the slider element and the plate adjacent to the intermediate plate cooperating to enclose fluid in the trench between the first point and the second point.

21. A microvalve device comprising:
a body having a fixed portion and defining at least an axis, a first port, and a second port;
a slider element disposed for movement along the axis within the body, with one axial end of the slider element being exposed to pressure in a variable-volume region defined between the axial end of the slider element and the fixed portion of the body, the slider element being axially movable between a first position blocking flow through the first port and a second position in which flow through the first port to the second port is unblocked;
a first fluid conduit feeding pressure from the second port to the variable-volume region in a manner that pressure of the fluid within the first fluid conduit will exert a first force upon the slider element perpendicular to the axis of movement of the slider element; and
a second fluid conduit feeding pressure from the second port to the variable-volume region in a manner that pressure of the fluid within the second fluid conduit will exert a second force, opposite in direction and substantially equal in value to the first force, upon the slider element.

* * * * *